(12) United States Patent
Wyner et al.

(10) Patent No.: US 11,100,510 B1
(45) Date of Patent: Aug. 24, 2021

(54) SCALABLE AND ADVANCED ANALYTICS COMPUTING PLATFORM FOR DISTRIBUTED LEDGER DATA AND CUSTODY SOLUTIONS

(71) Applicant: KPMG LLP, New York, NY (US)

(72) Inventors: Samuel Wyner, Albertson, NY (US); Salvatore Joseph Ternullo, Medford, MA (US); Shekar Atmakur, Atlanta, GA (US); Kevin Bornatsch, Jersey City, NJ (US); Sydney M. Rice, Boston, MA (US)

(73) Assignee: KPMG LLP, New York, NY (US)

( * ) Notice: Subject to any disclaimer, the term of this patent is extended or adjusted under 35 U.S.C. 154(b) by 0 days.

(21) Appl. No.: 17/233,067

(22) Filed: Apr. 16, 2021

Related U.S. Application Data

(63) Continuation of application No. 17/196,334, filed on Mar. 9, 2021, now Pat. No. 11,068,473.

(60) Provisional application No. 63/019,135, filed on May 1, 2020.

(51) Int. Cl.
*H04L 9/32* (2006.01)
*H04L 9/06* (2006.01)
*H04L 29/06* (2006.01)
*G06Q 20/06* (2012.01)
*G06Q 20/36* (2012.01)
*G06Q 20/40* (2012.01)

(52) U.S. Cl.
CPC ....... *G06Q 20/4016* (2013.01); *H04L 9/0643* (2013.01); *H04L 2209/38* (2013.01)

(58) Field of Classification Search
CPC . H04L 2209/38; H04L 9/3239; H04L 9/0637; H04L 9/3247; H04L 2209/56; G06F 16/2379; G06F 16/27; G06Q 20/4016
See application file for complete search history.

(56) References Cited

U.S. PATENT DOCUMENTS

| | | | |
|---|---|---|---|
| 10,192,073 B2 | 1/2019 | Marin | |
| 10,469,248 B2 * | 11/2019 | Chalakudi | ............ H04L 9/3236 |
| 10,915,641 B2 | 2/2021 | Smith et al. | |
| 2015/0363777 A1 | 12/2015 | Ronca et al. | |
| 2018/0165758 A1 | 6/2018 | Saxena et al. | |

(Continued)

FOREIGN PATENT DOCUMENTS

WO     2019237126 A1    12/2019

OTHER PUBLICATIONS

Indela et al., Toward Semantic Cryptography APIs, 6 pages (Year: 2016).*

(Continued)

*Primary Examiner* — Thuy Dao
(74) *Attorney, Agent, or Firm* — Hunton Andrews Kurth LLP

(57) ABSTRACT

Systems and methods disclosed herein are directed to a scalable and advanced analytics computing platform for distributed ledger data for integrating an entity's legacy systems, distributed ledger systems, and crypto-asset transactions, as well as related metadata. The systems and methods further relate to a custody adapter implementation that enables interactions across multiple custody technology providers, sub-custody providers, and internal custody solutions.

20 Claims, 25 Drawing Sheets

(56) References Cited

U.S. PATENT DOCUMENTS

2019/0236598 A1 8/2019 Padmanabhan
2020/0043007 A1 2/2020 Simons

OTHER PUBLICATIONS

"Bitcoin Mining Explained Like You're Five: Part 2—Mechanics", Escape Velocity, Visions of a Freer Future, https://chrispacia.wordpress.com/2013/09/02/bitcoin-mining-explained-like-youre-five-part-2-mechanics/, 2013, pp. 1-22.
Wang et al., Measurement and Analysis of the Bitcoin Networks: A View From Mining Pools, Feb. 21, 2019, pp. 1-13.
Moser et al., "Towards Risk Scoring of Bitcoin Transactions", Department of Information Systems, University of Munster, Munster, Germany, 2014, pp. 16-32.
International Searching Authority, International Search Report and Written Opinion, International Application No. PCT/US21/21506, dated May 20, 2021, pp. 1-15.

\* cited by examiner

Address Balance Validation

Use Case Description 403: External auditors are able to leverage the immutability and transparency enabled by public blockchains in order to independently validate the existence and control of customer accounts. FIs can simply provide the list of their addresses to their auditor. The auditor can then look up the balance of each address using an easily accessible blockchain explorer.

Run Description 404: Test Run for acceptance testing

Type of Validation 405: Reconciliation ▽

Sub-ledger Upload: 406 C:\Users\CF\SubLedger\Sub-ledger-2019-12-31.csv of Addresses 407: ● Single  ○ Multiple  ○ File Upload

Address 408: 1A1zP1eP5QGefi2DMPTfTL5SLmv7DivfNa   BTC ▽ of Dates 409: ○ Single  ○ Multiple  ● Range

Dates 410: 12/01/2019   12/31/2019

Run

Figure 4A

Address Balance Validation

| Reconciled 411 | | | | | Breaks 412 | | | | |
|---|---|---|---|---|---|---|---|---|---|
| Address 413 | Currency 414 | Date 415 | Balance (native) SL 416 | Balance (USD) SL 417 | 418 Balance (native) blockchain | 419 Balance (USD) blockchain | First Transaction 420 | Last Transaction 421 | # of Transactions 422 |
| 1A1zP1ePSQGefi2DMPTf TL5SLmv7DivfNa | BTC | 12/01/2019 | 12 BTC | $12,000.00 | 12 BTC | $12,000.00 | 0000000000000000 000000002f5e7... | 0000000000000000 00000000047f926... | 35 |
| 1A1zP1ePQGefi2DMPTfTL 5SLmv7DivfN | BTC | 12/02/2019 | 11.456 BTC | $11,340.00 | 11.456 BTC | $11,340.00 | 0000000000000000 000000002f5e7... | 0000000000000000 00000000047f926... | 35 |
| 1A1zP1ePQGefi2DMPTfTL 5SLmv7DivfN | BTC | 12/03/2019 | | | | | | | |
| 1A1zP1ePQGefi2DMPTfTL 5SLmv7DivfN | BTC | 12/04/2019 | | | | | | | |
| 1A1zP1ePQGefi2DMPTfTL 5SLmv7DivfN | BTC | 12/05/2019 | | | | | | | |
| 1A1zP1ePQGefi2DMPTfTL 5SLmv7DivfN | BTC | 12/06/2019 | | | | | | | |
| 1A1zP1ePQGefi2DMPTfTL 5SLmv7DivfN | BTC | 12/07/2019 | | | | | | | |
| ... | ... | ... | ... | ... | ... | ... | ... | ... | ... |
| 1A1zP1ePSQGefi2DMPTf TL5SLmv7DivfNa | BTC | 12/31/2019 | 31 BTC | $23,487.95 | 31 BTC | $23,487.95 | 0000000000000000 000000002f5e7... | 0000000000000000 00000000047f926... | 35 |

Export

Figure 4B

Address Balance Validation

| | Reconciled 411 | | | | Breaks 412 | | | | | | |
|---|---|---|---|---|---|---|---|---|---|---|---|
| Address 413 | Currency 414 | Date 415 | Balance (native) SL 416 | Balance (USD) SL 417 | 418 Balance (native) blockchain | 419 Balance (USD) blockchain | Difference (native) 430 | Difference (USD) 431 | 420 First Transaction (blockchain) | 421 Last Transaction (blockchain) | # of Transactions 422 |
| 1A1zP1eP5... | BTC | 12/01/2019 | 12 BTC | $12,000.00 | 11.5 BTC | $11,500.00 | .5 BTC | $500.00 | 000000... | 000000... | 35 |
| 1A1zP1eP5... | BTC | 12/02/2019 | | | | | | | | | 35 |
| 1A1zP1eP5... | BTC | 12/03/2019 | | | | | | | | | |
| 1A1zP1eP5... | BTC | 12/10/2019 | | | | | | | | | |
| 1A1zP1eP5... | BTC | 12/11/2019 | | | | | | | | | |
| ... | ... | ... | ... | ... | | | | | | | |
| 1A1zP1eP5... | BTC | 12/31/2019 | 31 BTC | $23,487.95 | 31 BTC | $23,487.95 | 0 | 0 | 00000... | 00000... | 35 |

Export

Figure 4C

Address Balance Validation

| | |
|---|---|
| Use Case Description 403 | External auditors are able to leverage the immutability and transparency enabled by public blockchains in order to independently validate the existence and control of customer accounts. FIs can simply provide the list of their addresses to their auditor. The auditor can then look up the balance of each address using an easily accessible blockchain explorer. |
| Run Description 404 | Test Run for acceptance testing |

Type of Validation 430: Calculate Address Balances ▽

\# of Addresses 431: ● Single  ○ Multiple  ○ File Upload

Address 432: 1A1zP1eP5QGefi2DMPTfTL5SLmv7DivfNa  BTC ▽

\# of Dates 433: ○ Single  ○ Multiple  ● Range

Dates 434: 12/01/2019   12/31/2019

Run

Figure 4D

Address Balance Validation

| Address Balances | | | | | | | |
|---|---|---|---|---|---|---|---|
| Address 440 | Currency 441 | Date 442 | Balance (native) 443 | Balance (USD) 444 | First Transaction 445 | Last Transaction 446 | # of Transactions 447 |
| 1A1zP1eP5QGefi2DMPTfTL5SL mv7DivfNa | BTC | 12/01/2019 | 12 BTC | $12,000.00 | 0000000000000000 0002f5e7... | 0000000000000000 00047f926... | 35 |
| 1A1zP1eP5QGefi2DMPTfTL5SL mv7DivfNa | BTC | 12/02/2019 | 11.456 BTC | $11,340.00 | 0000000000000000 0002f5e7... | 0000000000000000 00047f926... | 35 |
| 1A1zP1eP5QGefi2DMPTfTL5SL mv7DivfNa | BTC | 12/03/2019 | | | | | |
| 1A1zP1eP5QGefi2DMPTfTL5SL mv7DivfNa | BTC | 12/04/2019 | | | | | |
| 1A1zP1eP5QGefi2DMPTfTL5SL mv7DivfNa | BTC | 12/05/2019 | | | | | |
| 1A1zP1eP5QGefi2DMPTfTL5SL mv7DivfNa | BTC | 12/06/2019 | | | | | |
| 1A1zP1eP5QGefi2DMPTfTL5SL mv7DivfNa | BTC | 12/07/2019 | | | | | |
| ... | ... | ... | ... | ... | ... | ... | ... |
| 1A1zP1eP5QGefi2DMPTfTL5SL mv7DivfNa | BTC | 12/31/2019 | 31 BTC | $23,487.95 | 0000000000000000 0002f5e7... | 0000000000000000 00047f926... | 35 |

Export

Figure 4E

Fractional Reserve Detection

| Addresses Reconciled 460 | | Amount Mismatches 461 | | | Address Mismatches 462 | | Customer Act Reconciled 463 | Customer Act Breaks 464 | | |
|---|---|---|---|---|---|---|---|---|---|---|
| Address 470 | Currency 471 | Date 472 | Balance (native) SL Address 473 | Balance (USD) SL Address 474 | 475 Balance (native) Blockchain Address | 476 Balance (USD) blockchain Address | First Transaction 477 | Last Transaction 478 | # of Transactions 479 |
| 1A1zP1eP5QGefi2DMPTf TL5SLmv7DivfNa | BTC | 11/01/2019 | 12 BTC | $12,000.00 | 12 BTC | $12,000.00 | 000000000000000 0000000002f5e7.... | 000000000000000 00000000047f926.... | 3 |
| 0x24cc76CD862482DA76 cb127daDBfdc7f0fa21563 | ETH | 11/01/2019 | 100 ETH | $19,540.34 | 100 ETH | $19,540.34 | 0xdb53cc190a2a 442fd8a9347ad.... | 0x74f5dfaeb64c6 62955b17827.... | 5 |

Export

Figure 4G

Fractional Reserve Detection

| Address 470 | Reconciled | | | Amount Mismatches 461 | | | | Address Mismatches | Customer Act Reconciled | Customer Act Breaks | | |
|---|---|---|---|---|---|---|---|---|---|---|---|---|
| | Currency 471 | Date 472 | Balance (native) SL Address 473 | Balance (USD) SL Address 474 | Balance (native) blockchain Address 475 | Balance (USD) blockchain Address 476 | Difference (native) 480 | Difference (USD) 481 | | First Transaction 477 | Last Transaction 478 | # of Transactions 479 |
| 1A1zP1eP5QGefi2DMPTfTL5SLmv7DivfNa | BTC | 11/01/2019 | 12 BTC | $12,000.00 | 11 BTC | $11,000.00 | 1 BTC | $1,000.00 | | 00000000000000000002f5e7ee5d... | 00000000000000000000047f926... | 3 |
| 0x6a76c822eb2a7d21D81Bb8b4943512db2b17C266 | ETH | 11/01/2019 | 50 ETH | $9,770.17 | 25 ETH | $4,885.09 | 25 ETH | $4,885.09 | | 0xdb53cc190a2a442fd8a347ad... | 0x74f5dfaeb64c6629555b17827... | 5 |

Export

Figure 4H

| Reconciled | | Amount Mismatches | | | Address Mismatches 462 | | Customer Act Reconciled | | Customer Act Breaks | |
|---|---|---|---|---|---|---|---|---|---|---|
| Address 470 | Currency 471 | Date 472 | Balance (native) SL Address 473 | Balance (USD) SL Address 474 | 475Balance (native) blockchain Address | 476Balance (USD) blockchain Address | First Transaction 477 | Last Transaction 478 | | # of Transactions 479 |
| 1A1zP1eP5QGefi2DMPTf TL5SLmv7DivfNa | BTC | 11/01/2019 | | | 11 BTC | $11,000.00 | 00000000000000 000000002f5e7... | 00000000000000 0000000047f926... | | 3 |
| 0x24cc76CD862482DA76c b127daDBfdc7f0fa21563 | ETH | 11/01/2019 | 100 ETH | $19,540.34 | | | 0xdb53cc190a2a4 42fd8a9347... | 0x74f5dfaeb64c6 62955b17827... | | 5 |
| 0x6a76c822eb2a7d21D81 Bb8b4943512db2b17C266 | ETH | 11/01/2019 | | | | | | | | |

Fractional Reserve Detection

Export

Figure 4I

Fractional Reserve Detection

| Reconciled | | Amount Mismatches | Address Mismatches | Customer Act Reconciled 463 | | Customer Act Breaks |
|---|---|---|---|---|---|---|
| Address Type 482 | Total held for Customers (native) 483 | Total held for Customers (USD) 484 | Balance in Subledger address (native) 485 | Balance in Subledger address (USD) 486 | Balance on chain (native) 487 | Balance on chain (USD) 488 |
| BTC | 1000 BTC | $9,950,000.00 | 1000 BTC | $9,950,000.00 | 1000 BTC | $10,000,000.00 |
| ETH | 1000 ETH | $136,950.00 | 1000 ETH | $136,950.00 | 1000 ETH | $137,000.00 |

Export

Figure 4J

Fractional Reserve Detection

| | Reconciled | | Amount Mismatches | | Address Mismatches | | Customer Act Reconciled | | Customer Act Breaks 464 | |
|---|---|---|---|---|---|---|---|---|---|---|
| Address Type 482 | Total held for Customers (native) 483 | Total held for Customers (USD) 484 | Balance in Subledger address (native) 485 | Balance in Subledger address (USD) 486 | Balance on chain (native) 487 | Balance on chain (USD) 488 | Difference to Subledger (native) 489 | Difference to Subledger (USD) 490 | Difference to on chain assets (native) 491 | Difference to on chain assets (USD) 492 |
| BTC | 1000 BTC | $9,950,000.00 | 900 BTC | $9,000,000.00 | 900 BTC | $9,000,000.00 | 100 BTC | $950,000.00 | 100 BTC | $950,000.00 |
| ETH | 1000 ETH | $136,950.00 | 1000 ETH | $136,950.00 | 1200 ETH | $164,400.00 | 0 ETH | $0 | 200 ETH | $27,450.00 |

Export

Figure 4K

SCALABLE AND ADVANCED ANALYTICS COMPUTING PLATFORM FOR DISTRIBUTED LEDGER DATA AND CUSTODY SOLUTIONS

CROSS REFERENCE TO RELATED APPLICATIONS

This Patent Application is a Continuation-in-Part (CIP) of U.S. patent application Ser. No. 17/196,334, filed Mar. 9, 2021, which claims priority to U.S. Application No. 63/019,135, filed May 1, 2020, the complete disclosures of which are incorporated herein by reference in their entirety.

FIELD OF THE INVENTION

The present invention relates to a scalable and advanced analytics computing platform used for integrating an entity's legacy systems, distributed ledger systems, and crypto-asset transactions, as well as related metadata and further relates to a custody adapter implementation that enables a single point to interact across multiple sub-custody providers and internal custody solutions.

BACKGROUND

Distributed ledger systems such as blockchains maintain immutable ledgers of all transactions that have occurred. Although distributed ledger systems can be designed differently, they still consist of similar core components including a distributed ledger, a consensus mechanism, applied cryptography, and smart contracts/decentralized applications. Further, distributed ledger systems can be categorized into permission-less networks or permissioned networks, with a recognition of increasing interoperability across these types of systems.

Transactions processed on a distributed ledger system reflect a flow of assets or data from one address to another. Each transaction is recorded as a unique event on a distributed ledger in a block of transactions, where each block is cryptographically linked to a prior block, creating an immutable history of transactions. In this regard, the ledger shows every transaction that has been processed on the network, consistently reflecting the current position of all addresses and participants. Transactions executed on distributed ledger systems are validated through consensus mechanisms, which can also vary by implementation. Consensus mechanisms deployed in permission-less blockchains, most notably through proof of work (PoW), enable coordinated participation of unknown participants by enforcing economic incentives within the protocol to maintain the integrity of the system.

For example, in the PoW consensus mechanism, transactions are confirmed by validator nodes, often called "miners," who dedicate computational cycles to produce "nonces" to solve algorithmic puzzles to earn economic incentives in the form of "block rewards." Block rewards are earned by the validator node who solves the puzzle and publishes the next block of valid transactions to the ledger, including their solution. Network participants can then verify the block using the solution provided by the winning validator, and confirm the accuracy of transactions reflected in the block against their own legers. In such a system, if a single entity (or group of colluding entities) controls a majority of the consensus resources (51% of computational capacity "hashpower" for PoW, and varying percentages or thresholds for other consensus mechanisms), that entity could then maliciously manipulate the ledger in a "double spend attack" or "blockchain re-organization." In the PoW context, the security model of the network is directly related to the amount of hashpower and the distribution of hashpower across validator nodes. This principle applies to other consensus-based validation mechanisms as well, e.g., Proof of Stake (PoS).

Further, transactions executed on distributed ledger systems are cryptographically recorded, which creates technical challenges to decrypt blocks of transactional data into structures that can be analyzed in meaningful ways. In addition, transactions recorded on distributed ledgers are executed using use digital signatures, including only a pseudonymous public key identifier on the ledger. The relationship between a public key (in a public key infrastructure (PKI) as used by distributed ledger technologies) and the identity of the entity using the key is not shared on permission-less blockchains, creating complexity to track and understand the relationship between transactions on the ledger and an individual entity. Finally, transactions are currency-agnostic without any established native fiat currency (e.g., U.S. dollars) pricing mechanism.

In these regards, the aggregation and analysis of on-chain data by a single system (that is, data residing on a distributed ledger) to provide valuable insights has proven to be non-trivial.

While transactional activity on permissioned and permission-less blockchains is being analyzed extensively across the market, the performance and security of consensus mechanisms has not been a focus of practical or in-production commercial applications such as proprietary trading. In this regard, there is a considerable lack of meaningful insights into the concentration of power to validate transactions through hashpower, presenting potential risks to network participants. For example, colluding nodes (by one or more entities), controlling 51%+ of the hashpower on the Bitcoin network, could execute fraudulent transactions or potentially alter past transactions.

The integration of business applications and assets hosted on distributed ledger systems present further challenges when used practically in conjunction with client-server legacy systems (i.e., non-distributed ledger systems), such as: (i) multiple systems are required to accomplish the same end goals, e.g., multiple anti-money laundering (AML) transaction monitoring systems that convey the same rules across disparate systems increasing operational and technical overhead, (ii) data quality issues make advanced analytics difficult or impossible, (iii) scale of transaction data and metadata can strain legacy systems, (iv) data privacy in addition to creating challenges in meeting, and/or (v) financial reporting and account requirements.

It would be desirable, therefore, to have systems and methods to aggregate and analyze complete, aggregate information across different data stores, including but not limited to, permission-less and permissioned distributed ledger systems alongside traditional client-server systems (e.g. enterprise resources planning systems, accounting systems, anti-money laundering systems, fraud detection systems, risk management systems) to overcome the deficiencies of known systems.

Custody in the context of digital assets generally refers to the management of cryptographic private keys. Private keys are used to authenticate asset ownership and to perform various function relating to the transaction of assets, message signing, etc. The custody function is performed by regulated businesses utilizing internally developed of third party custody technology. These service providers offering digital asset custody earn fees on assets under custody in addition to fees for processing different transaction types. In many cases, service providers have developed adjacent crypto prime service offerings for execution and borrowing/lending. These services have flourished with demand from institutional investors for borrowing, lending, and execution amongst other types of asset administration services. A sub-custodian refers to an entity that has been contracted to provide custody services on behalf of another custodian.

The current landscape of regulated digital custodians providing sub-custody services is largely comprised of crypto-native businesses (e.g., Coinbase, BitGo, Anchorage) with only one first mover (2018) from the traditional financial services perspective in Fidelity Digital Assets. Many of the first mover digital custodians operate on proprietary digital custody technology that has been developed internally to support safe-keeping of cryptographic key material. In addition to platform user interfaces, these custodian providers offering API integrations to their clients to support an array of functionality including balance look-ups, transaction processing, and various administrative functions. Similar to their internally developed digital custody infrastructure, these APIs are developed by each custodian and are unique in how they work and function.

In parallel to the wave of service providers building proprietary digital custody solutions, a robust product segment of third party digital custody technologies has emerged gaining strong traction from fast followers looking for the advances made across the digital custody technology segment. These custody technology providers have taken their own unique approaches to architecture and design of the digital custody solutions, offering different implementation models and adjacent technical services/integration. For many business models in the market, these third party product technologies offer complimentary capabilities to the previously described sub-custody model.

Currently, custody protocols are not standardized. Custody service providers and custody technology providers operate independently with their own proprietary underlying systems and protocols. As such, business models operating on multiple sub-custodians and/or custody technologies suffer challenges resulting from a lack of interoperability across solutions. Existing solution providers in the market for sub-custody and custody technology are not incentivized to solve this challenge which ultimately reduces frictions and switching costs between competitive providers. This leads to inconsistencies and complexities associated with governance and risk management across different transaction models, sub-custody providers and custody technologies.

SUMMARY

According to an embodiment, the invention relates to a scalable and advanced analytics computing platform for distributed ledger data for integrating an entity's client server (i.e., non-distributed ledger systems), distributed ledger systems, and crypto-asset transactions as well as related metadata. Exemplary embodiments of the platform can provide for a plurality of modules, with each module including analytics capabilities, as well as business logic and data aggregation capabilities, to analyze data from different distributed ledger (e.g., blockchains) and non-distributed ledger systems (e.g., enterprise resource planning (ERP) system). As such, the platform can provide novel insights into interactions between the different distributed ledger and the non-distributed ledger systems. Further, exemplary embodiments of the invention can also provide for novel user interfaces/user experiences.

According to an embodiment, the platform can provide benefits for a number of different use cases, e.g., blockchain public address balance validation, fractional reserve detection, digital asset custody (e.g., wallet) using multiparty computation (MPC) wallets and related processing for transaction creation, signing and transmissions.

For example, with regard to address balance validation, the platform can provide users with a process for comparing internal ledger balances with balances of addresses on a given public blockchain at the direction of the user. Further, a user can provide a listing of blockchain public addresses and a copy of an internal ledger, and, for a given date as defined by the user, the platform can calculate: (i) a total balance of blockchain assets per internal ledger, (ii) a total balance of blockchain assets per address, and/or (iii) a fiat currency (e.g., U.S. dollar, etc.) value of assets based on industry reference rates (obtained via external data provider) for a given date. The platform can then output a comparison of blockchain asset balances with internal ledger balances to validate the user's assets.

Further, with regard to fractional reserve detection, the platform can provide information that the total balance of an institution's blockchain assets as indicated on the blockchain's ledger matches the total customer balance as indicated in an ERP, internal ledger, or other legacy system. In particular, a user can provide a copy of an internal ledger including a listing of customer account balances and a listing of controlled blockchain addresses, and, for a given set of dates, the platform can calculate: (i) a total balance of blockchain assets per asset type based on internal ledger, (ii) a total balance of blockchain assets per asset type based on customer account records, (iii) a total balance of blockchain assets per asset type based on owned blockchain addresses, and/or (iv) a fiat currency (e.g., U.S. dollar, etc.) value of blockchain assets based on a daily reference rate. The platform can then output a comparison of the customer accounts in the internal ledger and owned blockchain addresses to validate that the customer account balances match the actual number of an entity's owned blockchain assets. Further, with regard to customer account validation, the platform can validate customer account accuracy by reconciling the balance of blockchain addresses against customer account balances via an internal ledger. In particular, a user can provide customer account records and a listing of blockchain addresses to the platform and it can then (i) trace transaction originating from owned blockchain addresses, (ii) compare transaction retrace data to customer account records, and/or (iii) confirm that the customer account balances are accurate. The platform can then output the results of the reconciliation indicating where balances did or did not match.

Further, with regard to digital asset custody (e.g., wallets), the platform can provide a single gateway to access different underlying sub-custodians and crypto-asset custody technologies. The platform leverages multiple underlying crypto-asset custody technologies, served in different implementation models including Software-as-a-Service (SaaS), Platform-as-a-Service (PaaS) and on-premise implementation models. The platform abstracts away the unique complexities each underlying custody technology and implementation model to provide a single gateway to govern and process cryptoasset transactions.

The execution of transactions using cryptoasset custody technologies generates reference data around the transaction signing process which can be captured and aggregated as factors for analytics on transaction processing and operational control. The systems and methods further relate to a custody adapter implementation that enables interactions across multiple sub-custody providers and internal custody solutions.

Further, the platform can also provide users with accurate time stamps of when a transaction was signed using underlying custody technologies and across the confirmation/consensus process on a given blockchain. As such, for transactions signed through the platform, a variety of transaction metrics can be provided. For example, the platform can provide the time stamps and metadata around key events including transaction signing, risk and compliance validations, as well as when a transaction is confirmed by other validators on the blockchain. The platform can then output granular transaction data and transaction metrics, such as time between transaction signing and blockchain validation.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 4A depicts a user interface that can be utilized for reconciliation during the user interaction in FIG. 3A according to an exemplary embodiment of the invention.

FIG. 4B depicts a first output of the reconciliation during the user interaction in FIG. 3A according to an exemplary embodiment of the invention.

FIG. 4C depicts a second output of the reconciliation during the user interaction in FIG. 3A according to an exemplary embodiment of the invention.

FIG. 4D depicts a user interface that can be utilized for calculating address balances during the user interaction in FIG. 3A according to an exemplary embodiment of the invention.

FIG. 4E depicts an output of the address balance calculation during the user interaction in FIG. 3A according to an exemplary embodiment of the invention.

FIG. 4G depicts a first output of the fractional reserve detection during the user interaction in FIG. 3B according to an exemplary embodiment of the invention.

FIG. 4H depicts a second output of the fractional reserve detection during the user interaction in FIG. 3B according to an exemplary embodiment of the invention.

FIG. 4I depicts a third output of the fractional reserve detection during the user interaction in FIG. 3B according to an exemplary embodiment of the invention.

FIG. 4J depicts a fourth output of the fractional reserve detection during the user interaction in FIG. 3B according to an exemplary embodiment of the invention.

FIG. 4K depicts a fifth output of the fractional reserve detection during the user interaction in FIG. 3B according to an exemplary embodiment of the invention.

DETAILED DESCRIPTION OF EMBODIMENTS

The following description of embodiments provides non-limiting representative examples to particularly describe features and teachings of different aspects of the invention. The embodiments described should be recognized as capable of implementation separately or in combination with other embodiments of the invention.

As the market for digital assets continues to grow and evolve, there is a need for investors to keep these assets safe from theft or loss. Regulated crypto custodians and exchanges have developed solutions designed to safeguard and protect customers' assets, while providing customers the ability to use, exchange or transfer their assets.

Traditional bearer instruments, such as cash, are issued in physical form. Whoever holds the physical asset is considered the owner. On a blockchain network, control of cryptoassets resides with the holder of a cryptographic private key which unlocks a public key wallet address used to execute transactions and move assets on the network. Custodians maintain the security of cryptographic keys controlling cryptoassets recorded on a public blockchain. This can be accomplished through internal custody architectures which are developed using software and dedicated physical appliances in hardware security modules (HSMs). Because digital assets are considered cryptographic bearer instruments, if the associated keys are lost or stolen, the digital asset will be inaccessible and unrecoverable. Accordingly, the custody capability provides a critical foundation for institutions to offer crypto products and services.

Investors and entities continue to grow their allocations and positions in cryptoassets. The improving performance, scalability, privacy and interoperability of blockchain infrastructures facilitate and enable crypto transactions. As the crypto economy grows and expands, traditional custodians and other entities seek to develop ways to engage with cryptoasset owners. This may require them to build or purchase custody solutions that are catered to their specific needs and business objectives. An embodiment of the present invention recognizes that technical and operational requirements of crypto asset custody, security and exchange create unique challenges for enterprises.

An embodiment of the present invention is directed to enabling entities to perform transactions, balance queries, and other critical administrative functions across multiple sub-custody providers and third party technologies while utilizing a single governance console to perform manage transactions and related risks.

Figure 1A:
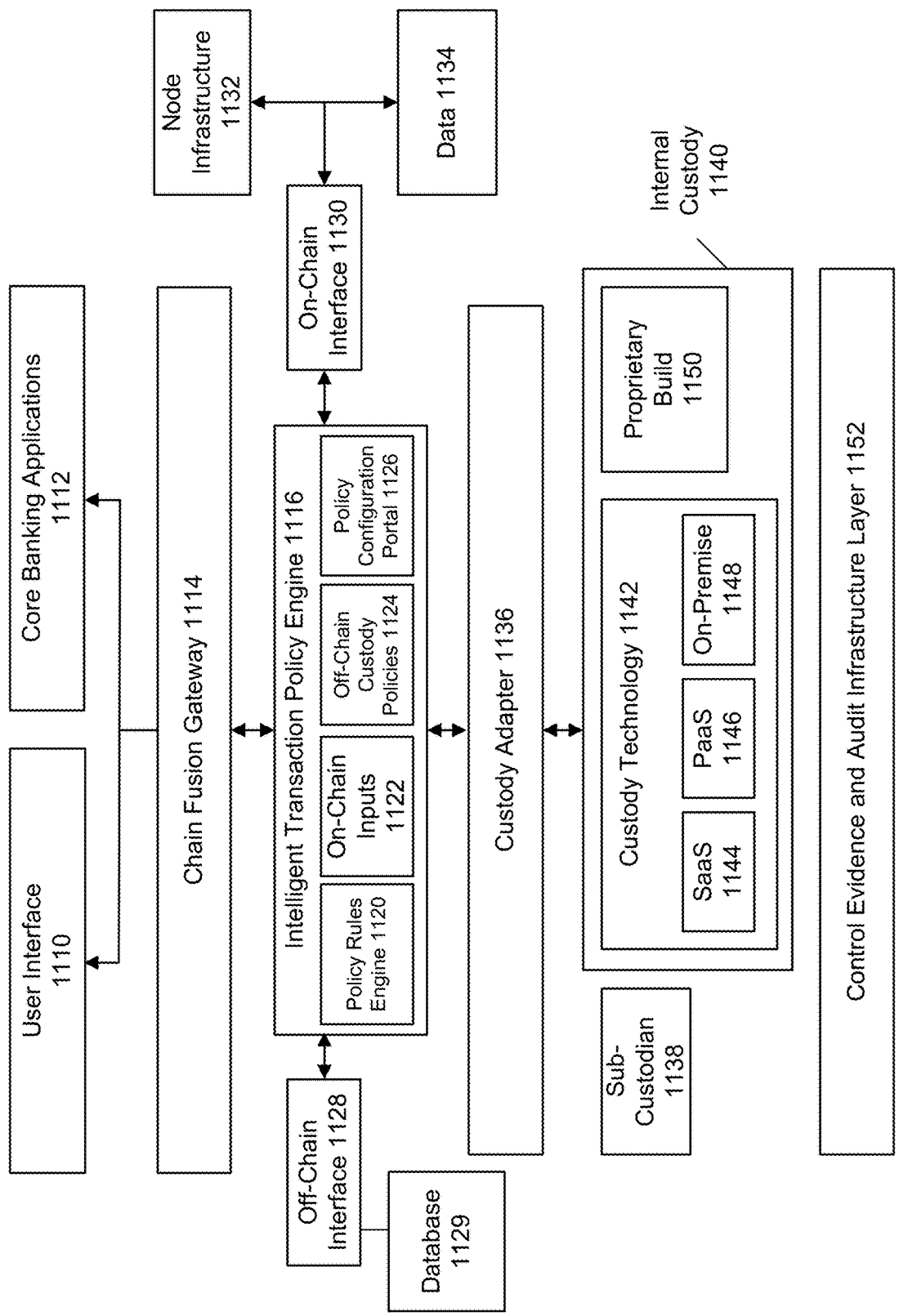
FIG. 1a depicts a system architecture that illustrates a custody adapter and an intelligent Transaction Policy Engine that connects custody solution(s) to client infrastructure according to an exemplary embodiment of the invention.

FIG. 1a depicts a system architecture that illustrates a custody adapter and an intelligent Transaction Policy Engine that connects custody solution(s) to client infrastructure according to an exemplary embodiment of the invention. Chain Fusion Gateway 1114 provides a single API to interact across sub-custody providers and internal custody solutions. Chain Fusion Gateway 1114 enables interactions and exchange of data through interfaces, including User Interface 1110 and Core Banking Applications 1112. For example, User Interface 1110 may represent a client branded interface.

Intelligent Transaction Policy Engine 1116 allows for consistent definition and governance policy rules from on-chain and off-chain sources to apply against transaction types processed through Chain Fusion Gateway 1114. For example, policy rules may be provided by Off-Chain Interface 1128 and On-Chain Interface 1130. Off-Chain Interface 1128 may receive data from external databases represented by Database 1129. On-Chain Interface 1130 may communicate with Node Infrastructure 1132 and various sources of data represented by Data 1134. Intelligent Transaction Policy Engine 1116 may include Policy Rules Engine 1120, On-Chain Inputs 1122 (e.g., on-chain third party policy inputs), Off-Chain Custody Policies 1124 and Policy Configuration Portal 1126.

Custody Adapter 1136 may represent unique adapters based on an implementation model, APIs, etc. to allow for a governance policy. This may be based on custody relationship type and/or other factors. Custody services ensure availability and accessibility to facilitate transactions on blockchain networks. Entities in the space can build custody solutions or utilize third party custody service providers that comply with the organizational needs and business objectives including customer needs.

Custody Adapter 1136 may interact with sub-custody providers, represented by Sub-Custodian 1138, and internal custody solutions, represented by Internal Custody 1140. In this exemplary illustration, Internal Custody 1140 may include Custody Technology 1142 and Proprietary Build 1150. For example, an entity, such as a financial institution, may leverage a sub-custodian in conjunction with internally developed custody solutions. An embodiment of the present invention may further support Software-as-a-Service (SaaS) 1144, Platform-as-a-Service (PaaS) 1146 and On-Premise 1148 implementations. Proprietary Build 1150 describes Proprietary Custody Systems built on $3^{rd}$ Party HSMs or Proprietary HSM infrastructure. All events in the platform are cryptographically recorded within the Control Evidence and Audit Infrastructure Layer 1152 allowing for proper retention of evidence and data to support audit requirements.

The custody capability is utilized primarily within Qualified Custodians and crypto exchanges. Qualified custodians deliver fully-managed custody services to institutions that invest in cryptoassets and/or support structured products developed with exposure to cryptoassets. These custodians operate under banking and/or trust licenses. Digital asset exchanges also deploy custody capabilities through digital wallets use to invest and trade digital assets. Digital asset exchanges serve retail investors as well as institutional traders, and private investment funds.

Alongside the crypto ecosystem's maturation, a number of Qualified Custodians exchanges for digital assets have emerged enabling institutions to invest, trade and/or otherwise participate in cryptoassets. Generally, the leading Qualified Custodians and exchanges in the market today have developed their custody solutions using Proprietary Custody Systems built on $3^{rd}$ Party HSMs or Proprietary HSM infrastructure (shown by Proprietary Build 1150).

As shown in FIG. 1a, sub-custodian providers (represented by Sub-Custodian 1138) may include providers such as BitGo, Fidelity, Coinbase Custody, Paxos, Gemini, Prime Trust, Genesis/Volt and Anchorage, for example. With these regulated offerings, digital assets may be segregated and held in trust for the benefit of clients. In addition, these solutions may offer segregated cold storage with dedicated on-chain addresses to meet segregated funds requirements and to provide transparency to clients.

Alongside Qualified Custodians and exchanges who have developed Proprietary systems, there are other service providers offering exchange and lending that have used $3^{rd}$ Party Product Tech (represented by Custody Technology 1142) enable Internal Custody 1140 in order to transact and transfer digital assets.

Custody Technology 1142 may be delivered in different implementation models including: Software as a Service (SaaS) 1144, Platform as a Service (PaaS) 1146, and On-Premise 1148 implementation models. In addition, some service providers have elected to develop digital custody systems built on Proprietary Build 1150, leveraging proprietary internally developed HSMs or $3^{rd}$ party HSM providers, may include providers, such as Gemalto, Ncipher, IBM and Kryptus, for example. Accordingly, Internal Custody enables transactions, transfers and exchange of digital assets, within the control of a business (as opposed to using a licensed Qualified Custodian).

As shown by 1144, SaaS custody tech solutions may enable entities to activate and build a digital asset businesses while using a fully managed $3^{rd}$ party platform with no hardware or HSM requirements for the customer. These solutions often leverage multi-signature or MPC software to support security objectives to protect assets. These solutions also provide protection against attacks (including cyber-attacks, internal collusion, and human error) through hardware isolation and multi-layer security technology. SaaS custody tech solutions offer graphical user interfaces in addition to APIs which can allow for automation in $3^{rd}$ party interactions once provisioned. Exemplary SaaS solutions may include BitGo, Fireblocks, Curv, etc.

As shown by 1146, Platform as a service (PaaS) represents a platform-as-a-service model which requires user configuration of hardware and physical security devices (PSDs) which interact with the software component of the platform. Users are responsible for security and utilization of these hardware PSDs to process transactions, query balances and perform administrative functions to set up and approve changes to transaction rules amongst other administrative functions. This enables platform users to develop, run and manage business functions through the platform while embedding physical and geographical distribution of hardware. Exemplary PaaS solutions may include Ledger Vault, etc.

$3^{rd}$ As shown by 1148, On-Premise solutions using party product technologies which are deployed into the client's technology environment, are designed to serve traditional financial institutions building Qualified Custodian services and seeking to integrate the services alongside Custody and Administration for traditional assets. Such solutions may provide a custody system that enables customers to own, operate and manage digital assets while controlling the entire cryptographic key management lifecycle within the organization's control environment. Exemplary On-Premise solutions may include BitGo, Unbound etc.

An embodiment of the present invention recognizes that the decision making process of selecting a digital asset custodian is a multifaceted and complex determination. Some considerations include reputation, brand, technology capabilities, asset support, cyber security, historical cyber security events, attestations by third-parties (e.g. SOC1, SOC2), etc. In addition, some recognized differentiators in the Qualified Custodian space include order execution services, access to over the counter (OTC) desks, fund administration reporting, tax reporting as well as other adjacent services.

With current solutions, multiple counter parties and multiple technology interaction models result in complexities, inconsistencies as well as difficulties in integration. An embodiment of the present invention recognizes the operational and technological challenges in interacting with multiple disparate Qualified Custodians and Internal Custody systems. Each provider and its underlying technology is defined and built in a different way. Accordingly, each Qualified Custodian offers different capabilities, products and features through an UI or API. An entity interacting with various Qualified Custodian and Internal Custody solutions may further add to the complexities and disjointedness of interacting with multiple systems, each including interfaces and APIs with different capabilities which generally require specific interaction and maintenance. Moreover, each service (Qualified Custodian and/or Internal Custody system) may have a unique risk profile and other differentiators that will drive business decisioning and objectives. Multiple Qualified Custodian relationships may be needed to operate across multiple jurisdictions further adding to the complexities in some implementations. As systems and services evolve and expand, each modification (whether involving an addition or removal of a service or feature) will require a specific integration of associated capabilities.

Current custody solutions were not designed to interact with multiple providers. An embodiment of the present invention is directed to providing a seamless experience across various custody providers and services. Because each business is unique, a single end-to-end solution is not available and would not be able to address varying business objectives and risk considerations. For example, a client may leverage multiple Qualified Custodians or Internal Custody systems beneath a single client-facing product offering, enabling the ability to optimize the service across risk and insurance coverage.

As shown in FIG. 1a, Custody Adapter 1136 may interact with multiple providers, including Sub-Custodian 1138, Internal Custody 1140 and other services/providers. Sub-Custodian 1138 may include qualified custodial service providers that are registered licensed financial services businesses operating in digital assets. Interactions with service providers may occur via API. An embodiment of the present invention is directed to receiving various unique API calls to manage third party custodial relationships. Custody Adapter 1136 may normalize the different API calls between the various custody providers. In addition, the normalization of API calls may extend across third-party custody tech and proprietary build implementations represented by entities in 1140, respectively, to facilitate internal self-custody services.

As represented by Sub-Custodian 1138, a financial entity may rely on strategic sub-custody relationships with providers that have various technology capabilities, operational processes and controls to service digital assets. In addition, as represented by Custody Technology 1142, the financial entity may build components using third party technology based on their requirements.

According to an embodiment of the present invention, the Custody Adapter 1136 includes a normalization layer that facilitates interaction across different APIs to perform a set of functions in a normalized and consistent manner.

For a sub-custody provider, a specific API call (e.g., API call ABC) may be used to send a transaction. For another sub-custody provider, a different API call (e.g., API call XYZ) may be used to send a similar transaction. Custody Adapter 1136 may support transaction processing workflows across multiple sub-custody models and internal custody systems and provide normalization. This may involve normalizing data relating to transaction amount, recipient details, timestamps, risk profile, insurance perspective, etc.

A particular sub-custody service may offer a set of functions. The set of functions may include sending a transaction, approving a transaction, viewing transaction, etc. For each of these functions/actions, transactions may be normalized to perform each unique and nuanced action in a consistent manner. The normalization will provide a one-to-many relationship model for these features, allowing a layer to apply consistent and uniform governance and control. An embodiment of the present invention is directed to reducing complexities and providing consistent control and oversight across various connections, APIs, etc. and validating controls over one-off processes that can impact the flow of value within an organization.

Intelligent Transaction Policy Engine 1116 may apply transaction policies and rule sets that are designed to detect public blockchain networks and compliance risks identified through On-Chain Inputs 1122 provided through the On-Chain interface 1130 by Data providers, represented by Data 1134. Policies and rules may be managed by Policy Rules Engine 1120 where administrative users can configure, modify and approve specific rules. Intelligent Transaction Policy Engine 1116 may apply rules to proactively scan the public blockchain network to see if a specific transaction may be subject to network or compliance risks. For example, a different rule set may be required depending on the type of transaction, the recipient wallet and its AML risk profile, business objectives, insurance coverage and various other factors and considerations. An embodiment of the present invention may consider nuanced differences in custody workflow and processes for each third party entity. For example, some rules may be specific to transaction monitoring related (e.g., AML), market surveillance, jurisdictional processing restrictions, etc. and some rules may define restrictions that block transactions involving a particular wallet address and other restrictions on where someone can send or cannot send. This may further depend on the type of organization as well as business objectives and goals.

With an embodiment of the present invention, a series of off-chain rules may be embodied in a policy engine to allow for policies to be applied across various underling sub-custody and internal custody interactions, as represented by Off-Chain Custody Policies 1124. Off-chain policies may relate to enterprise controls, risk measures, and compliance components which mandate approvals for transactions depending on the nature of the transaction and related information.

As shown in FIG. 1a, Intelligent Transaction Policy Engine 1116 may receive data from various sources and inputs including Off-Chain Interface 1128 and On-Chain Interface 1130. For example, On-Chain data may be received via On-Chain Inputs 1122.

Through Off-Chain Interface 1128, an embodiment of the present invention may apply controls to perform checks prior to initiating transactions on the blockchain network. Once a transaction is initiated, it is irrevocable.

On-Chain Interface 1130 may communicate with various data sources, represented by Node Infrastructure 1132 and Data 1134. For example, On-Chain Interface 1130 may analyze data from blockchain networks in real-time. The real-time data may relate to how blockchain networks are processing transactions, costs of transactions, network congestion, whether transaction will fails; edge case risk event (51% attack), etc. An embodiment of the present invention is directed to deriving signals and/or other information and data relating to technology risk and uncertainty associated with a public blockchain. The derived signals may then be encoded and/or implemented by the Intelligent Transaction Policy Engine 1116.

Data 1134 may access risk analytics from various sources, including Coin Metric's Farum which provides a comprehensive approach to blockchain network risk management. For example, it enables users to identify network attacks, double spends, blockchain splits as well as market abnormalities via an enterprise-grade API. Data 1134 may access other blockchain network risk management tools and services that allow organizations to monitor and manage network attacks, transaction reorganizations, fee volatility and other unusual network event risks. An embodiment of the present invention may leverage various sources of on-chain data across capabilities and modules.

In addition, Data 1134 may represent analytics including on-chain analytics relating to network risk, AML, analytics, etc. An embodiment of the present invention is directed to mapping and indexing transaction data and using heuristic analytics and clustering to identify patterns and relationships between various transactions in different public wallet addresses. An embodiment of the present invention may then derive a risk score for the wallet addresses. For example, a sub-custody user may want to send an outbound transaction from the user's wallet to a recipient wallet address. However, this recipient wallet address may be listed as being associated with bad actors or negative actions. If the sub-custody user attempts to send the outbound transaction, the sub-custody would then prevent the user from making this transaction. By applying policies, an embodiment of the present invention may identify a sanctioned address and accordingly halt the transaction. This may then lead to suspicious activity reporting and identification and consideration of risk events.

Through On-Chain Interface 1130, an embodiment of the present invention may consider data relating to holistic real-time public risk analytics, network risk and network intelligence risk insights via Node Infrastructure 1132. An embodiment of the present invention is directed to a cohesive integrated architecture that applies standard risk and enterprise control checks. As a result, complexities and inconsistencies in experience and data may be substantially reduced if not eliminated.

According to an exemplary embodiment, a user may interact with Chain Fusion user interface (as described below) to process a first exemplary transaction and a second exemplary transaction. For the first transaction, transaction processing may be provided through a sub-custodian (represented by 1138). In this example, information may be entered through a user interface (such as User Interface 1110) where the information is then structured and certain checks may be applied.

The second transaction may be performed through an internal custody solution (represented by 1140). In this example, the organization may use a third party service provider's node to connect to the network. Node Infrastructure 1132 may be provided by a service provider (Node as a Service—NaaS) or a user may host their own nodes for blockchain networks and connect the On-Chain Interface 1130 to those nodes. Node Infrastructure 1132 may serve as an on-ramp for transactions where sub-custody or third party custody tech does not offer node infrastructure as a part of their service as well as for proprietary build represented by 1150. For example, a node infrastructure provider may connect to Chain Fusion Gateway 1114 through an On-Chain Interface 1130 as illustrated in FIG. 1a. The approved transaction may be broadcast via the node, represented by Node Infrastructure 1132.

An embodiment of the present invention is directed to the integration of Chain Fusion Gateway 1114, Intelligent Transaction Policy Engine 1116 and Custody Adapter 1136. The unique and novel system enables the application of consistent intelligent polices that consider off-chain environment and on-chain environment. This enables the ability to interact across various different custody models, infrastructure, and API calls in a consistent and seamless manner.

An embodiment of the present invention is directed to preventing transactions from processing that may result in a risk event including non-compliance or transaction failure due to network risks. A middle layer of an embodiment of the present invention communicates with many different crypto custodian technologies, sets policies and governance and applies intelligence to improve risk predictions related to transactions.

The components illustrated in FIG. 1a are merely exemplary and illustrative, the system may interact with additional modules/components, a combination of the modules/components described and/or less modules/components than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

Figure 1B:
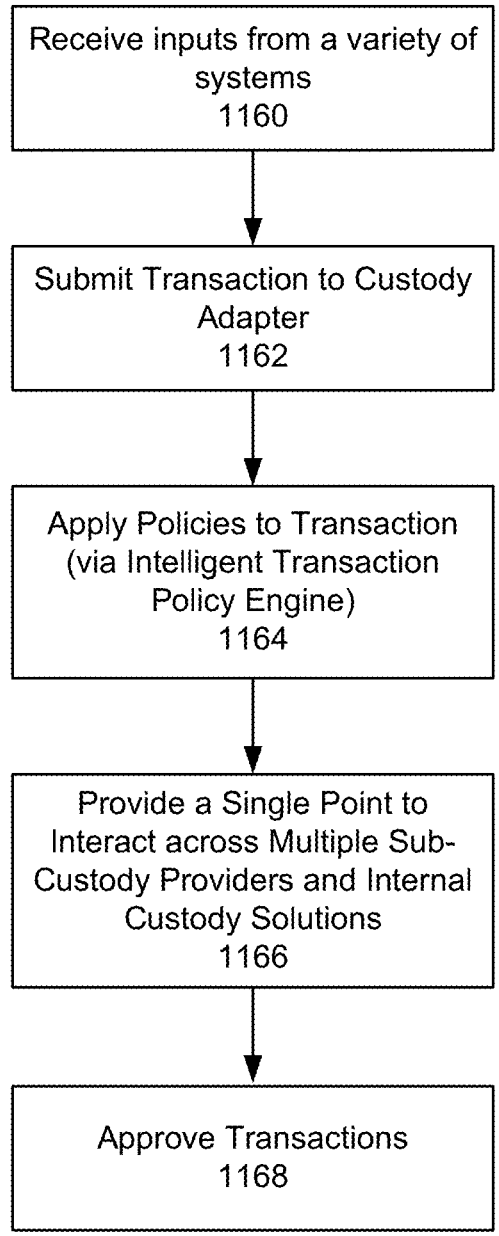
FIG. 1b depicts a process diagram showing the flow of a transaction through the custody adapter according to an exemplary embodiment of the invention.

FIG. 1b is an exemplary flowchart, according to an embodiment of the present invention. FIG. 1b illustrates an exemplary application and does not limit the scope of the present invention. In this example, a National Bank A provides access to crypto products and services. Bank A has chosen to use three sub-custody providers to maximize the insurance coverage of their assets to align with their risk appetite. At step 1160, inputs from a variety of systems may be received. Inputs may include data from various applications, including a banking application. For example, a Custody Operations personnel may enter a banking application and select a transaction type and a custody source and then enter the transaction details. Standard application workflows may apply. At step 1162, a transaction may be submitted from an application, such as a core banking application, to the Chain Fusion Gateway. At step 1164, policies may be applied to the transaction based on custody factors and considerations. Factors may include asset type, risk profile, custody type, custody risk profile, on-chain AML, risk, on-chain network risk, etc. At step 1166, an embodiment of the present invention provides a single point to interact across multiple sub-custody providers and internal custody solutions. For example, the transaction may be structured based on an underlying custody adapter to interact with target sub-custodians, custody technology including SaaS, PaaS and On-Premise, and Proprietary Builds. At step 1168, approved transactions may be broadcast via a custody tech provider or a node infrastructure deployed through Chain Fusion (or other network/architecture/system). While the process of FIG. 1b illustrates certain steps performed in a particular order, it should be understood that the embodiments of the present invention may be practiced by adding one or more steps to the processes, omitting steps within the processes and/or altering the order in which one or more steps are performed.

Figure 1C:
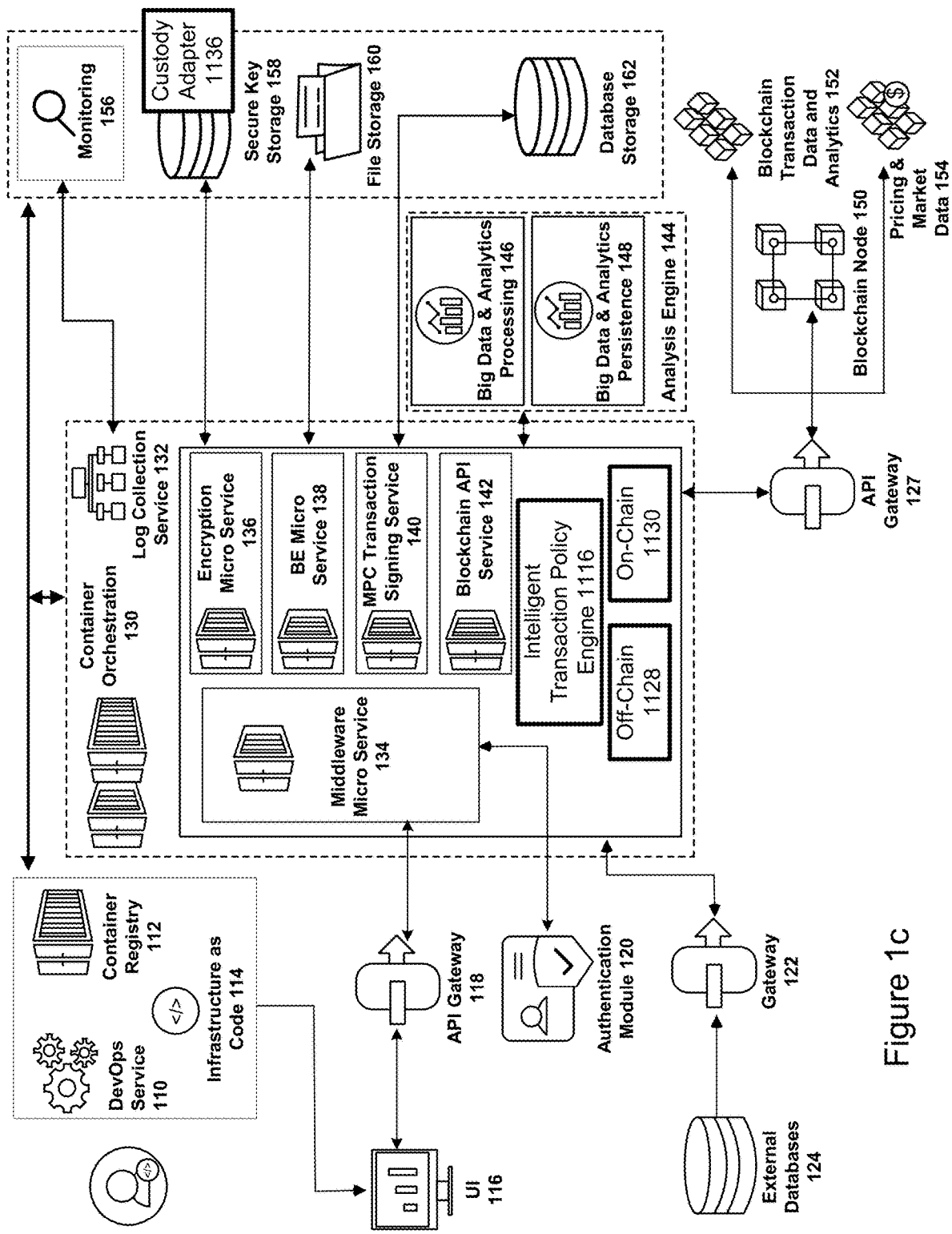
FIG. 1c depicts a system architecture of an analytics computing platform for distributed ledger data according to an exemplary embodiment of the invention.

FIG. 1c depicts a system architecture of an analytics computing platform for distributed ledger data, according to an exemplary embodiment of the invention. As depicted in the figure, an exemplary system includes a DevOps Service 110 (e.g., set of practices combing software development and information-technology operations), a Container Registry 112, Infrastructure as Code 114 (e.g., management of system infrastructure using a descriptive model), a User Interface (UI) 116, API Gateway 118, an Authentication Module 120, Gateway 122, External Databases 124, a Container Orchestration 130 (including a Log Collection Service 132, a Middleware Micro Service 134, Encryption Micro Service 136, Backend (BE) Micro Service 138, MPC Transaction Signing Service 140, Blockchain API Service 142, etc.), an Analysis Engine 144 (including Big Data & Analytics Processing 146 and Big Data & Analytics Persistence 148), API Gateway 127, Blockchain Node 150, Blockchain Transaction Data and Analytics 152 (which represents blockchain data from a data provider), Pricing & Market Data 154/Reference Rates module, a Monitoring module 156, a Secure Key Storage 158, a File Storage 160, and/or a Database Storage 162.

According to an embodiment, the gateways represented by 118, 122, 127 can be used to connect to external sources/systems. For example, Container Orchestration 130 may communicate with Blockchain Node 150 via API Gateway 127. In another embodiment, instead of an API gateway, a Web Socket can be used. Further, although the Container Orchestration 130 leverages a micro-services architecture, other types of architecture can also be used, e.g., monolithic approach, etc. In addition, although the figure depicts the blockchain data as a distinct data source, any data source that provides this information from a blockchain or similar distributed ledger solution can also be used. Similarly, although the figure depicts the pricing & market data module as a distinct data source, any data source that provides this information can be used, e.g., the blockchain data module. Further, according to an embodiment, the blockchain node can be a redundant and/or independent copy of the distributed ledger. In this regard, the system can be associated with more than one blockchain node (e.g., multiple for one blockchain), different blockchains (e.g., Bitcoin (BTC), Ethereum (ETH), etc.), as well as host a node as part of the system. Further, according to an embodiment, the external databases can include the general ledger and/or sub-ledger, which are associated with the user's internal books and records. Further, each of the middleware service, the Encryption Micro Service 136, the BE Micro Service 138, the MPC Transaction Signing Service 140, and/or the Blockchain API Service 142 can be based on the same programming language, e.g., Python. Further, according to an embodiment, the components that constitute the system and are not part of the UI can be considered the backend of the platform.

As shown in FIG. 1c, Secure Key Storage 158 may include Custody Adapter 1136 detailed in FIG. 1a. Through Custody Adapter 1136, Secure Key Storage 158 may interface with multiple custody providers. In one embodiment, an MPC Transaction Signing Service 140 may be leveraged as the chosen technology underpinning the custody solution which connects to Secure Key Storage 158. In this embodiment, Secure Key Storage 158 supports enterprise key management of encryption platform. In addition, Secure Key Storage 158 may also support storage for asset controlling keys for custody services through Custody Adapter 1136. FIG. 2D provides additional details relating to MPC transaction signing.

Within Container Orchestration 130, Intelligent Transaction Policy Engine 1116 may receive data and data analytics from various sources including Off-Chain Interface 1128 (or via Gateway 122 (FIG. 1c) which connects to off-chain datasources) and On-Chain Interface 1130 (or via API Gateway 127 (FIG. 1c)). For example, Intelligent Transaction Policy Engine 1116 may apply policies based on triggers obtained via On-Chain Interface 1130 or Off-Chain Interface 1128, which may be applied to transactions signed via secure key storage and custody adapter prior to being broadcast onto the network via Blockchain Node 150 or the custody provider via the Custody Adapter 1136. In this example, on-chain data may include network data, metadata, analytics and metrics, as represented by Blockchain Transaction Data and Analytics 152. As shown in FIG. 1c, Intelligent Transaction Policy Engine 1116 may interact with blockchain nodes represented by 150 via API Gateway 127 to access public blockchain information.

Figure 2A:
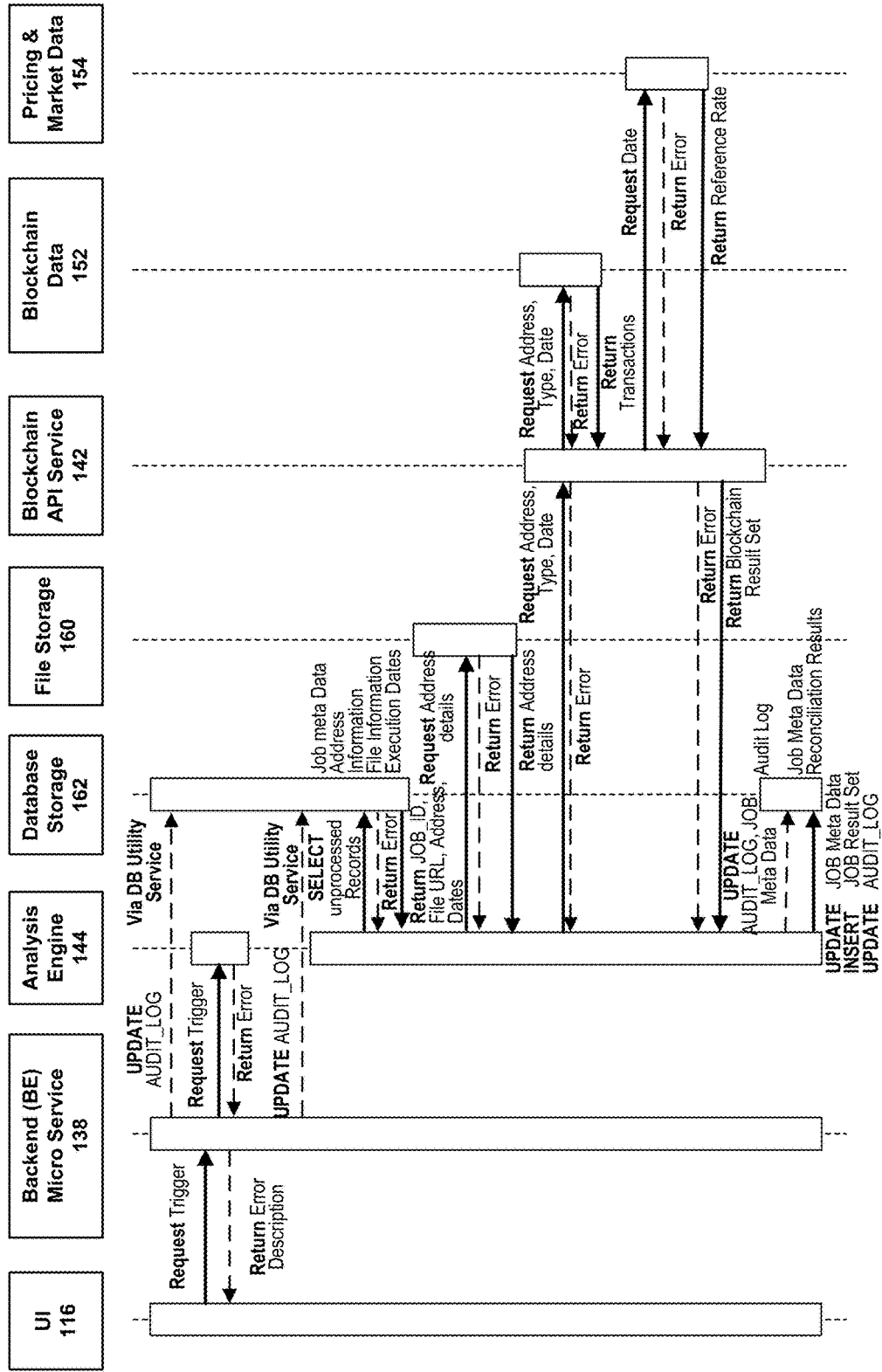
FIG. 2A depicts an address balance calculation flow diagram using the system in FIG. 1c according to an exemplary embodiment of the invention.

FIG. 2A depicts an address balance calculation flow diagram using the system in FIG. 1c according to an exemplary embodiment of the invention. As depicted in the figure, a user can trigger a request to the Analysis Engine 144 from the UI 116 via the platform Backend (BE) Micro Services 138. The Analysis Engine 144 selects records from the Database Storage 162 in order to retrieve a job ID (JOB_ID), file URL, address, and/or dates back to the Analysis Engine 144. If a file was uploaded for the addresses, the Analysis Engine 144 requests and retrieves the address details from the File Storage 160 which includes the addresses, as well as the address types. An embodiment of the present invention may support direct integrations with enterprise technologies via messaging technologies as well as modern integrations using APIs. For example, a file may be communicated via gateway to an external database to retrieve the address details. The Analytic Engine 144 can then send the address, type, and/or dates to the Blockchain API Service 142. In response, the Blockchain API Service 142 provides the received information to the Blockchain Data 152, which then returns transactions data to the Blockchain API Service 142. Further, the Blockchain API Service 142 also provides the received type and date information to the Blockchain Data 152 and the pricing & market data module/reference rates module represented by Pricing & Market Data 154, which then return transaction data and reference rate data, respectively, to the Blockchain API Service 142. Based on the received transaction and reference rate data, the Blockchain API Service 142 provides a blockchain result set to the Analysis Engine 144, which can then update the job metadata as well as insert the job result set in the database storage. According to an exemplary embodiment, the blockchain result set can include the transactional information for the addresses provided by the user as well as the reference rates for the type of blockchains for which addresses were provided and dates selected. In addition to depicting successful flow interactions (e.g., solid arrow), the figure also depicts unsuccessful flow/error interactions (e.g., dashed arrow). As such, if for some reason a request fails, an error may be returned.

Figure 2B:
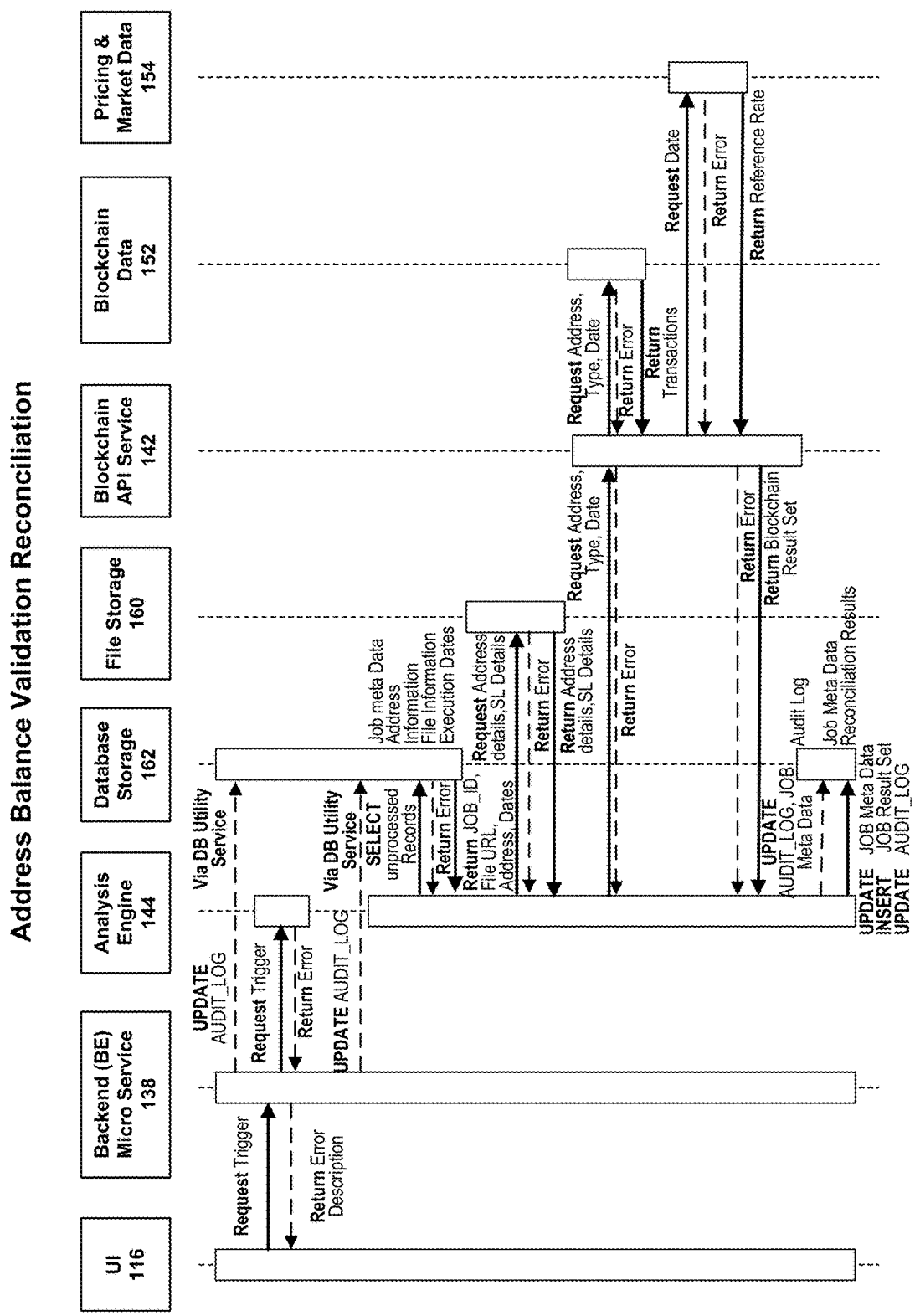
FIG. 2B depicts an address balance validation reconciliation flow diagram using the system in FIG. 1c according to an exemplary embodiment of the invention.

FIG. 2B depicts an address balance validation reconciliation flow diagram using the system in FIG. 1c according to an exemplary embodiment of the invention. As depicted in the figure, a user can trigger a request to the Analysis Engine 144 from the UI 116 via the BE Micro Service 138. The Analysis Engine 144 selects records from the Database Storage 162 in order to retrieve the job ID (JOB_ID), file URL, address, and/or dates back to the Analysis Engine 144. If a file was uploaded for the addresses, the Analysis Engine 144 requests and retrieves the address details and the subledger (SL) details from the File Storage 160 which includes the addresses, as well as the address types. The Analysis Engine 144 can then send the address, type, and/or date to the Blockchain API Service 142. In response, the Blockchain API Service 142 provides the received information to the Blockchain Data 152, which then returns transactions data to the Blockchain API Service 142. Further, the Blockchain API Service 142 also provides the received type and date information to the Blockchain Data 152 and the pricing & market data module/reference rates module represented by Pricing & Market Data 154, which then returns transaction data and reference rate data, respectively, to the Blockchain API Service 142. Based on the received transaction and reference rate data, the Blockchain API Service 142 provides a blockchain result set to the platform backend, which can then update the job metadata as well as insert the job result set in the Database Storage 162. In addition to depicting successful flow interactions (e.g., solid arrow), the figure also depicts unsuccessful flow/error interactions (e.g., dashed arrow). As such, if for some reason a request fails, an error may be returned.

Figure 2C:
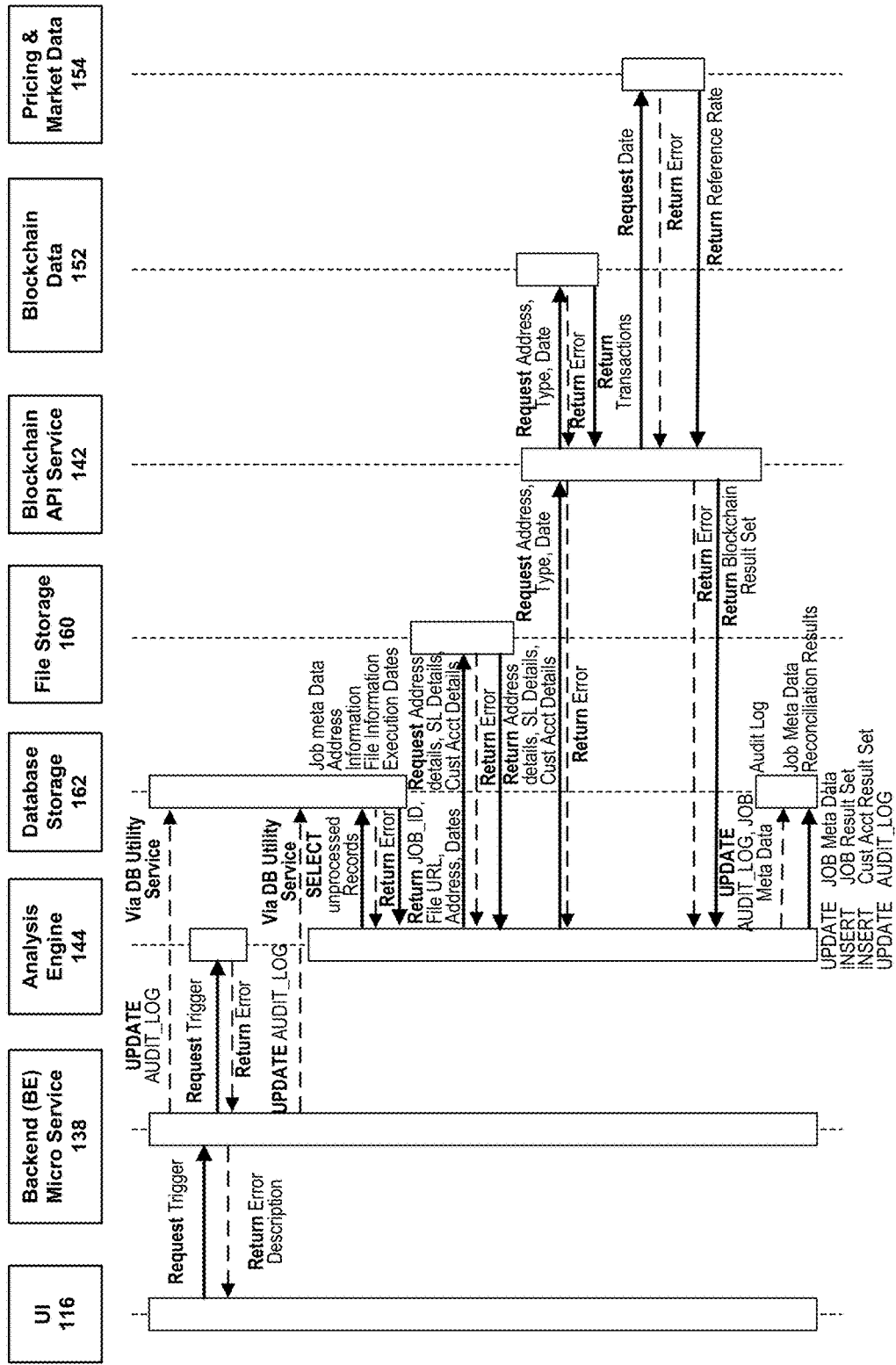
FIG. 2C depicts a fractional reserve detection flow diagram using the system in FIG. 1c according to an exemplary embodiment of the invention.
Figure 2D:
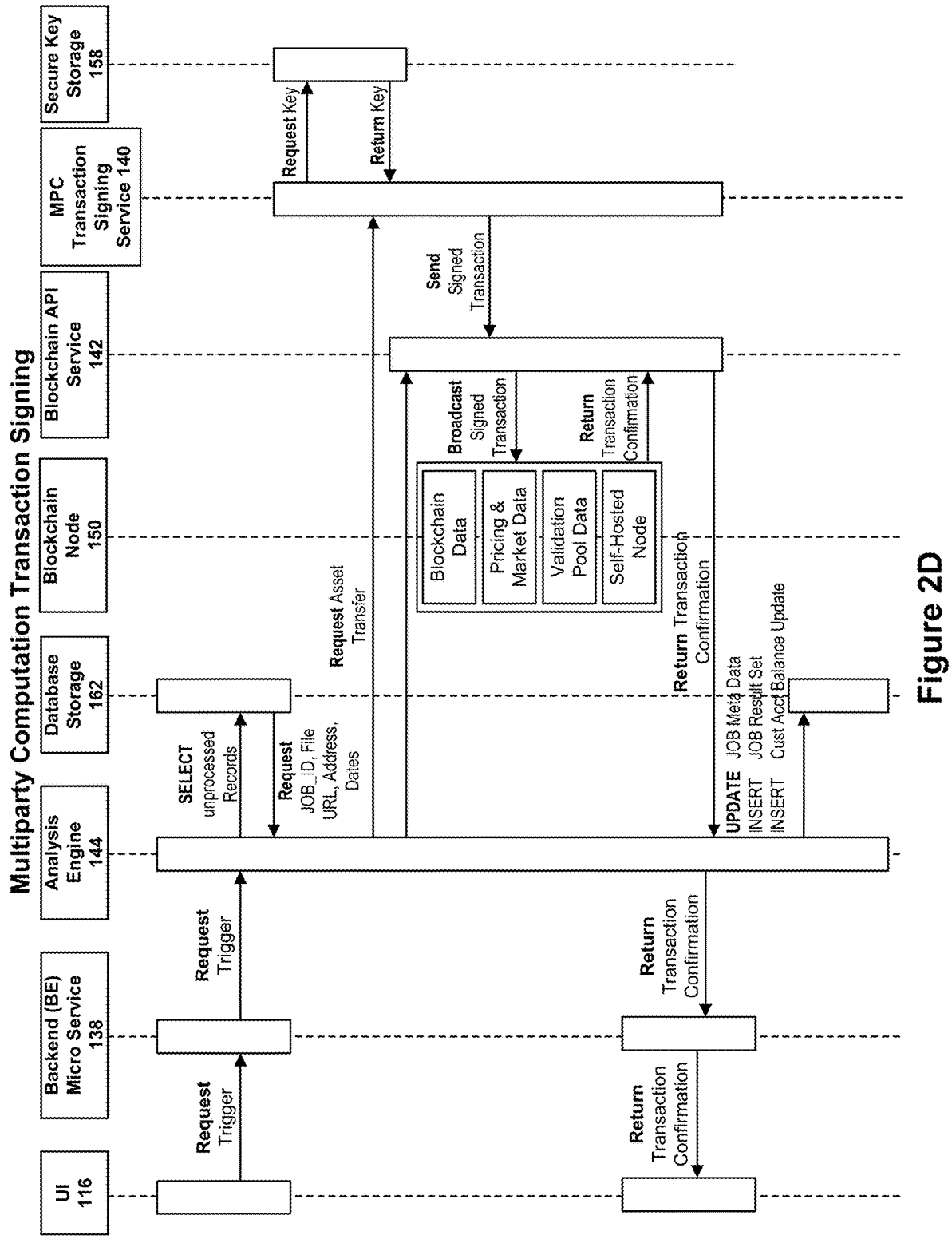
FIG. 2D depicts a multiparty computation transaction signing flow diagram using the system in FIG. 1c according to an exemplary embodiment of the invention.

FIG. 2C depicts a fractional reserve detection flow diagram using the system in FIG. 1c according to an exemplary embodiment of the invention. As depicted in the figure, a user can trigger a request to the Analysis Engine 144 from the UI 116 via the Backend (BE) Micro Services 138. The Analysis Engine 144 selects records from the Database Storage 162 in order to retrieve the job ID (JOB_ID), file URL, address, and/or dates back to the Analysis Engine 144. If a file was uploaded for the addresses, the Analysis Engine 144 requests and retrieves the address details, the SL details, and/or the customer account details from the File Storage 160 which includes the addresses, as well as the address types. The Analysis Engine 144 can then send the address, type, and/or dates to the Blockchain API Service 142. In response, the Blockchain API Service 142 provides the received information to the Blockchain Data 152, which then returns transactions data to the Blockchain API Service 142. Further, the Blockchain API Service 142 also provides the received type and date information to the Blockchain Data 152 and the pricing & market data module/reference rates module represented by Pricing & Market Data 154, which then returns transaction data and reference rate data, respectively, to the Blockchain API Service 142. Based on the received transaction and reference rate data, the Blockchain API Service 142 provides a blockchain result set to the Analysis Engine 144, which can then update the job metadata as well as insert the job result set and the customer account result set in the Database Storage 162. In addition to depicting successful flow interactions (e.g., solid arrow), the figure also depicts unsuccessful flow/error interactions (e.g., dashed arrow). As such, if for some reason a request fails, an error may be returned.

FIG. 2D depicts a multiparty computation transaction signing flow diagram using the system in FIG. 1c according to an exemplary embodiment of the invention. As depicted in the figure, a user can first send a trigger to the Analysis Engine 144 via the Backend (BE) Micro Services 138. The Analysis Engine 144 can then query unprocessed records from the Database Storage 162 in order to retrieve the job ID (JOB_ID), file URL, address, and/or dates back to the Analysis Engine 144. The Analysis Engine 144 can submit an asset transfer request to the MPC Transaction Signing Service 140, which can then request and retrieve a key from the Secure Key Storage 158. After receiving the key, the MPC Transaction Signing Service 140 may generate and send a signed transaction to the Blockchain API Service 142, which then broadcasts the signed transaction to Blockchain Node 150. In response, the Blockchain Node 150 can provide a transaction confirmation back to the Blockchain API Service 142. The Blockchain API Service 142 can then provide the transaction confirmation to the Analysis Engine 144, which can then provide the transaction confirmation to the UI 116, e.g., via the Backend (BE) Micro Services 138. Further, as depicted in the figure, the Analysis Engine 144 can also update the job metadata as well as insert the job result set and the customer account result set in the database storage.

Figure 2E:
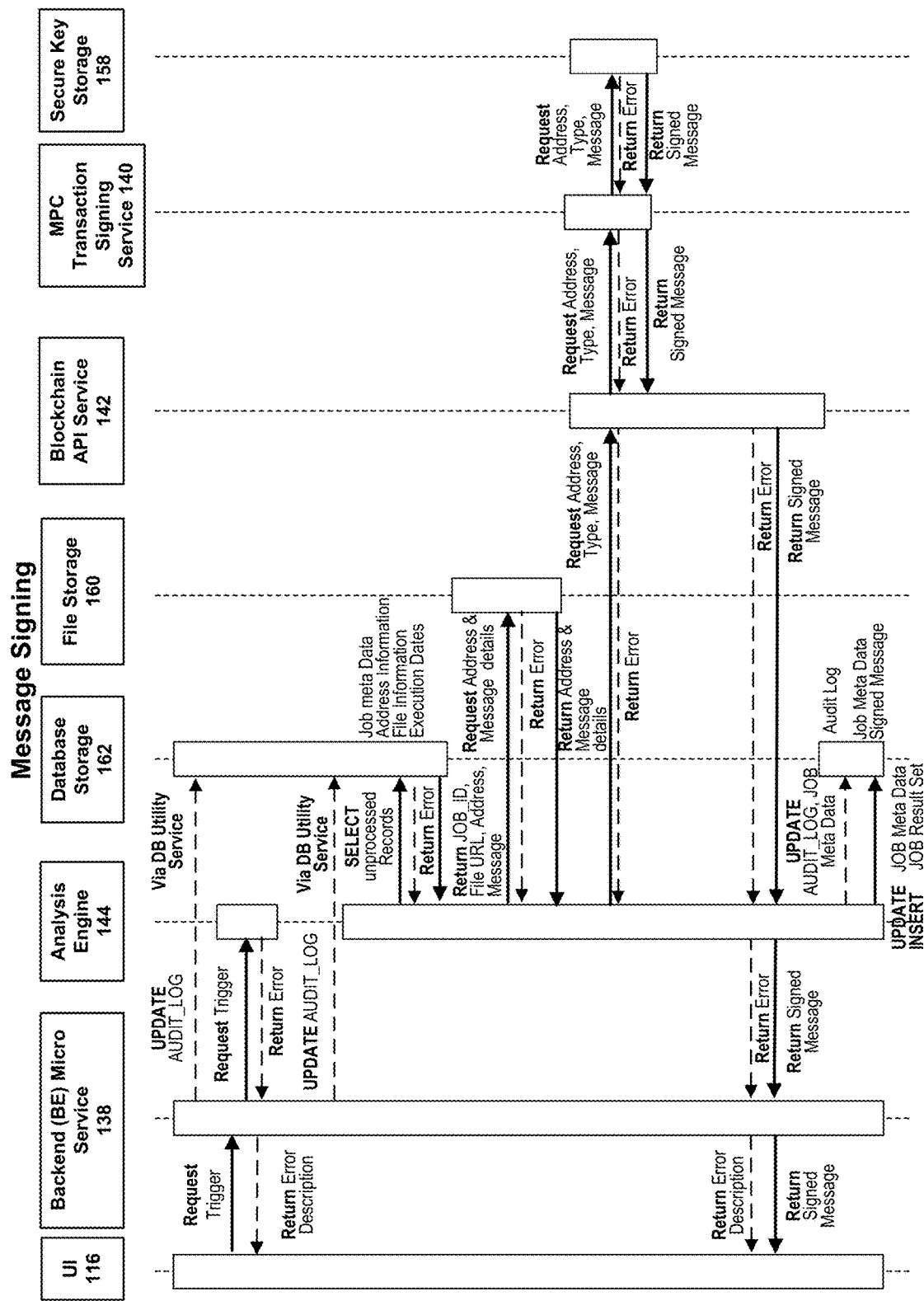
FIG. 2E depicts a message signing flow diagram using the system in FIG. 1c according to an exemplary embodiment of the invention.

FIG. 2E depicts a message signing flow diagram using the system in FIG. 1c according to an exemplary embodiment of the invention. As depicted in the figure, a user can trigger a request to the Analysis Engine 144 from the UT 116 via the Backend (BE) Micro Services 138. The Analysis Engine 144 selects records from the Database Storage 162 in order to retrieve the job ID (JOB_ID), file URL, address, and/or message back to the Analysis Engine 144. Analysis Engine 144 requests and retrieves the address and message details from the File Storage 160. The Analysis Engine 144 can then request address, type, and/or message to the Blockchain API Service 142 which then communicates with MPC Transaction Signing Service 140 and Secure Key Storage 158. Signed message may be returned from Secure Key Storage 158, via MPC Transaction Signing Service 140 to Blockchain API Service 142. Further, the Blockchain API Service 142 provides the signed message to Analysis Engine 144, which can then transmit to UT 116 and update Database Storage 162, accordingly. In addition to depicting successful flow interactions (e.g., solid arrow), the figure also depicts unsuccessful flow/error interactions (e.g., dashed arrow). As such, if for some reason a request fails, an error may be returned.

Figure 2F:
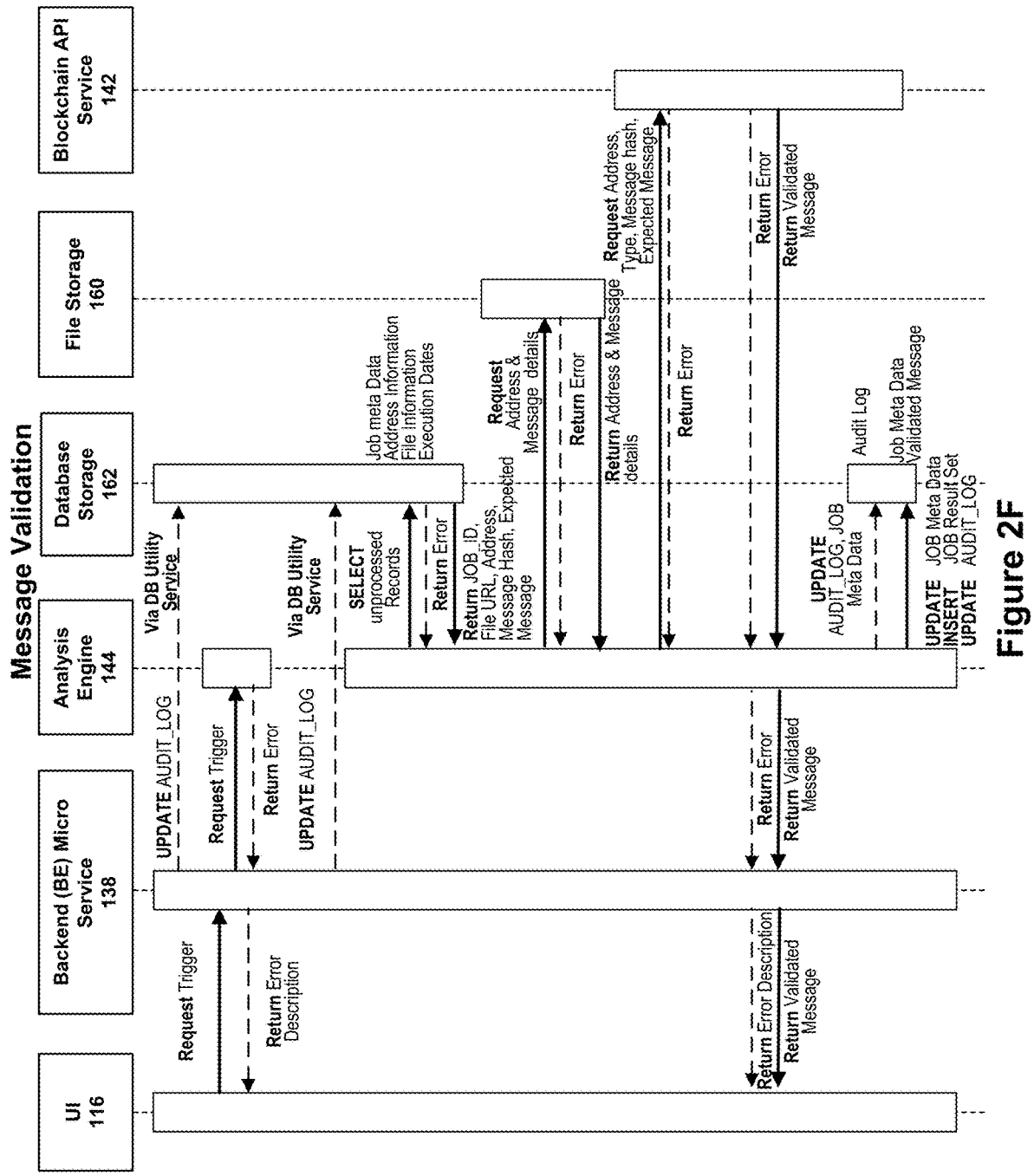
FIG. 2F depicts a message validation flow diagram using the system in FIG. 1c according to an exemplary embodiment of the invention.

FIG. 2F depicts a message validation flow diagram using the system in FIG. 1c according to an exemplary embodiment of the invention. As depicted in the figure, a user can trigger a request to the Analysis Engine 144 from the UI 116 via the Backend (BE) Micro Services 138. The Analysis Engine 144 selects records from the Database Storage 162 in order to retrieve the job ID (JOB_ID), file URL, address, message hash and/or expected message back to the Analysis Engine 144. Analysis Engine 144 requests and retrieves the address and message details from the File Storage 160. The Analysis Engine 144 can then request the address, type, message hash and/or expected message to the Blockchain API Service 142. In response, the Blockchain API Service 142 provides the validated message to Analysis Engine 144, which can then transmit to UI 116 and update Database Storage 162, accordingly. In addition to depicting successful flow interactions (e.g., solid arrow), the figure also depicts unsuccessful flow/error interactions (e.g., dashed arrow). As such, if for some reason a request fails, an error may be returned.

According to an embodiment, as depicted with FIGS. 2A to 2F, after a request gets triggered by a user, business logic within the platform can be initiated in order to leverage data from the blockchain and internal systems, as well as conduct data analytics and, therefore, provide value-adding insights to the user.

Figure 3A:
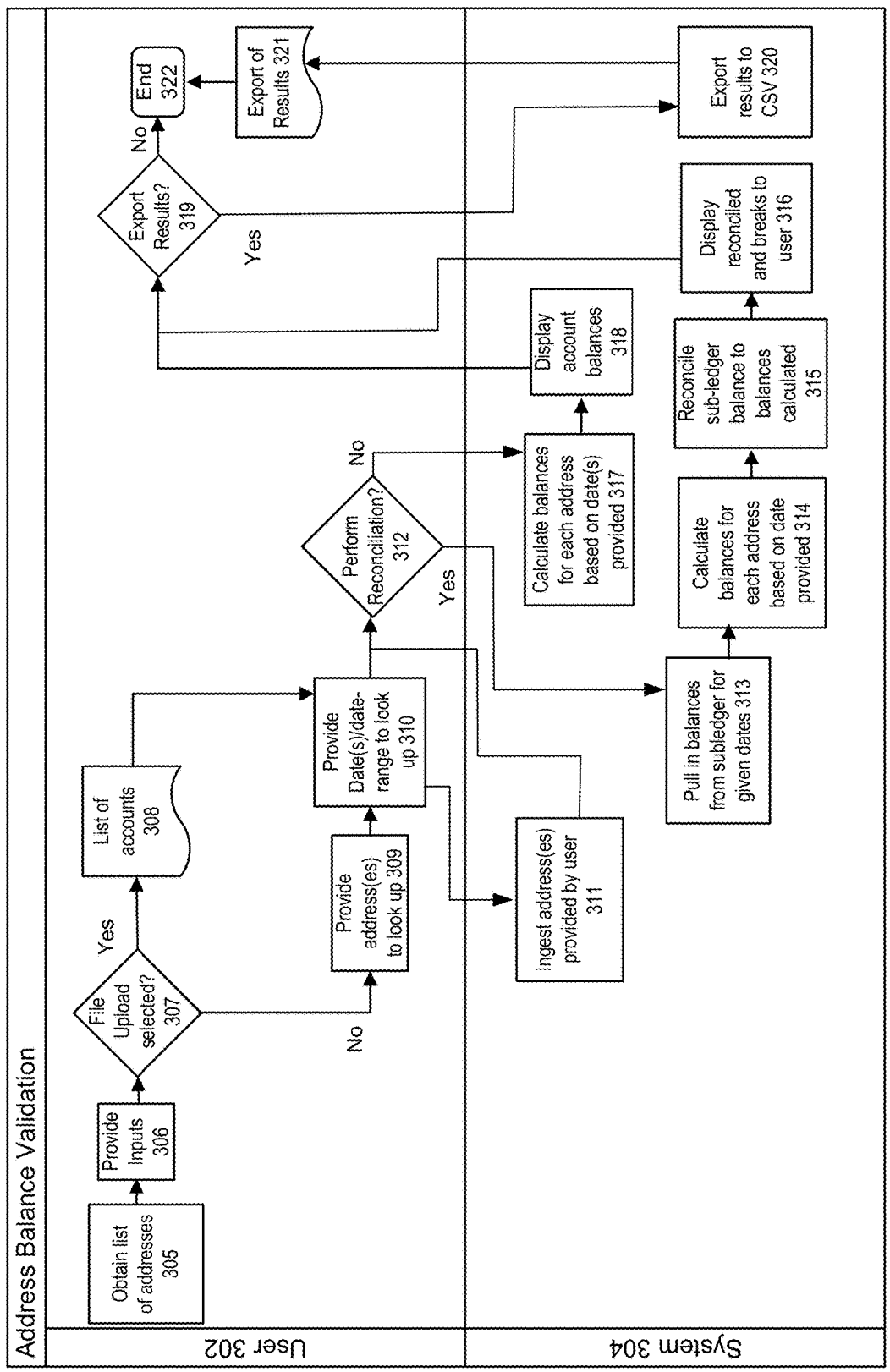
FIG. 3A depicts a user interaction for address balance validation with the system in FIG. 1c according to an exemplary embodiment of the invention.

FIG. 3A depicts a user interaction for address balance validation with the system in FIG. 1c according to an exemplary embodiment of the invention. FIG. 3A illustrates interactions between User 302 and System 304. As depicted in FIG. 3A, a user may obtain a list of addresses at 305. In this example, the user may provide a number of different inputs to the platform at 306. For example, the user can provide: (i) a short description to outline the purpose/ additional information of the run, (ii) a selection of whether a reconciliation should be performed or if only balances should be calculated, (iii) a selection if one address, multiple addresses, or a file of addresses will be provided, (iv) address(es) and/or file corresponding to the address(es) and/or file selection, (v) a selection if the validation will correspond to one date, multiple dates, or a date range, and/or (vi) dates corresponding to the date selection. After the inputs are provided, it is then determined if the file upload option was selected at 307. If the answer is yes, a list of accounts can be presented to the user via the UI at 308. In this regard, the list of accounts/addresses can be provided as a comma-separated value (CSV), Excel file in a predetermined format or other format. Further, the platform can also detect the type of address for each address that was provided in the uploaded file. If the type for an address cannot be automatically detected, the platform can then indicate to user which address the type could not be detected at 309. In this regard, processing for any of the addresses cannot begin until certain issues associated with the address types have been resolved. Further, if an address is provided for a blockchain for which the platform cannot pull data, the user can be informed and required to submit a new upload without that particular address, or the platform can continue processing the data for those addresses for which it was able to pull the data. At 310, a date range may be provided. At 311, addresses provided by the user may be ingested.

Then, step 312 may determine whether a reconciliation to the sub-ledger should be performed. If the answer is yes, a user may be required to upload a structured file containing the sub-ledger records (e.g., CSV file, Excel file, etc.), from which the platform can pull balances for the given dates at 313. In this regard, if the provided sub-ledger file does not follow the required structure, the platform can provide feedback to the user indicating such and also require that a new file be uploaded. Then, according to an embodiment, the platform can calculate balances for each address based on the date(s) provided at 314. In particular, the balances can be calculated based on the value of the crypto-asset at the provided date(s). In this regard, the platform can access at least one blockchain (e.g., Bitcoin, Bitcoin Cash, Ethereum, Litecoin, etc.) via the blockchain API service. The platform can then reconcile the sub-ledger balance to the balances calculated at 315. According to an embodiment, the reconciliation can include matching the addresses provided to the accounts in the sub-ledger, determining balances in the addresses in the sub-ledger for the given dates, and then reconciling sub-ledger balances to address balances calculated for the given dates.

After reconciliation, the reconciliation results can be displayed to the user via the UI at 316. In particular, the reconciliation results can include a complete list of items that could be reconciled with dollar amounts as well as a complete list of items that could not be reconciled with dollar amounts (breaks). In this regard, the list of items that could be reconciled can include at least one or more of the following information: an address, a type of address, a begin balance (first date selected by user), an end balance (last date selected by user), a first transaction ever conducted by this address, a most recent transaction within the time period defined by the user, and/or a number of transactions completed by the address in the given time period. Further, the list of items that could not be reconciled can include at least one or more of the following information: an address, a type of address, a begin balance as per sub-ledger (first date selected by the user), a begin balance as per address (first date selected by user), an end balance as per sub-ledger (last date selected by user), end balance as per address (last date selected by user), a difference of begin balances, a difference of end balances, a first transaction ever conducted by an address as per sub-ledger and blockchain, a most recent transaction within the time period defined by the user as per sub-ledger and address, a number of transactions completed by the address in the given time period as per sub-ledger and address, and a name of the user who ran the report. Further, the reconciliation results can also highlight discrepancies between the sub-ledger and the addresses. In this regard, such output can include an address, a type of address, a date of discrepancy, a balance as per sub-ledger on a given date, a balance as per address on a given date, and/or a difference between the two.

Further, according to an embodiment, it is determined if a reconciliation to the sub-ledger should not be performed, the platform can calculate balances for each address based on date(s) provided at 317. In particular, the platform can calculate balances of each address on given dates based on the value of the crypto-asset. In this regard, the platform can access at least one blockchain (e.g., Bitcoin, Bitcoin Cash, Ethereum, Litecoin, etc.) via the blockchain API service. After which, the address balance results can be displayed to the user via the UI at 318. In particular, the address balance results can include a complete list of items for which amounts were calculated with dollar amounts as well as a complete list of items for which amounts could not be calculated with dollar amounts (or breaks). According to an embodiment, the complete list of items for which amounts were calculated with dollar amounts can include the same information as the complete list of items that could be reconciled. Similarly, the complete list of items for which amounts were not calculated with dollar amounts can include the same information as the complete list of items that could not be reconciled.

According to an embodiment, after at least one of the reconciliation results and/or address balance results are displayed to the user, it can be determined if the results should be exported at 319. If the answer is yes, the results can be converted into a structured file format (e.g., CSV, Excel, etc.) and then exported at 320, 321. Otherwise, the process ends at 322.

Further, according to an embodiment, the platform can be configured to provide the user an option to purge data immediately after running the desired information. Similarly, that platform can also be used to purge all or some past run data.

Figure 3B:
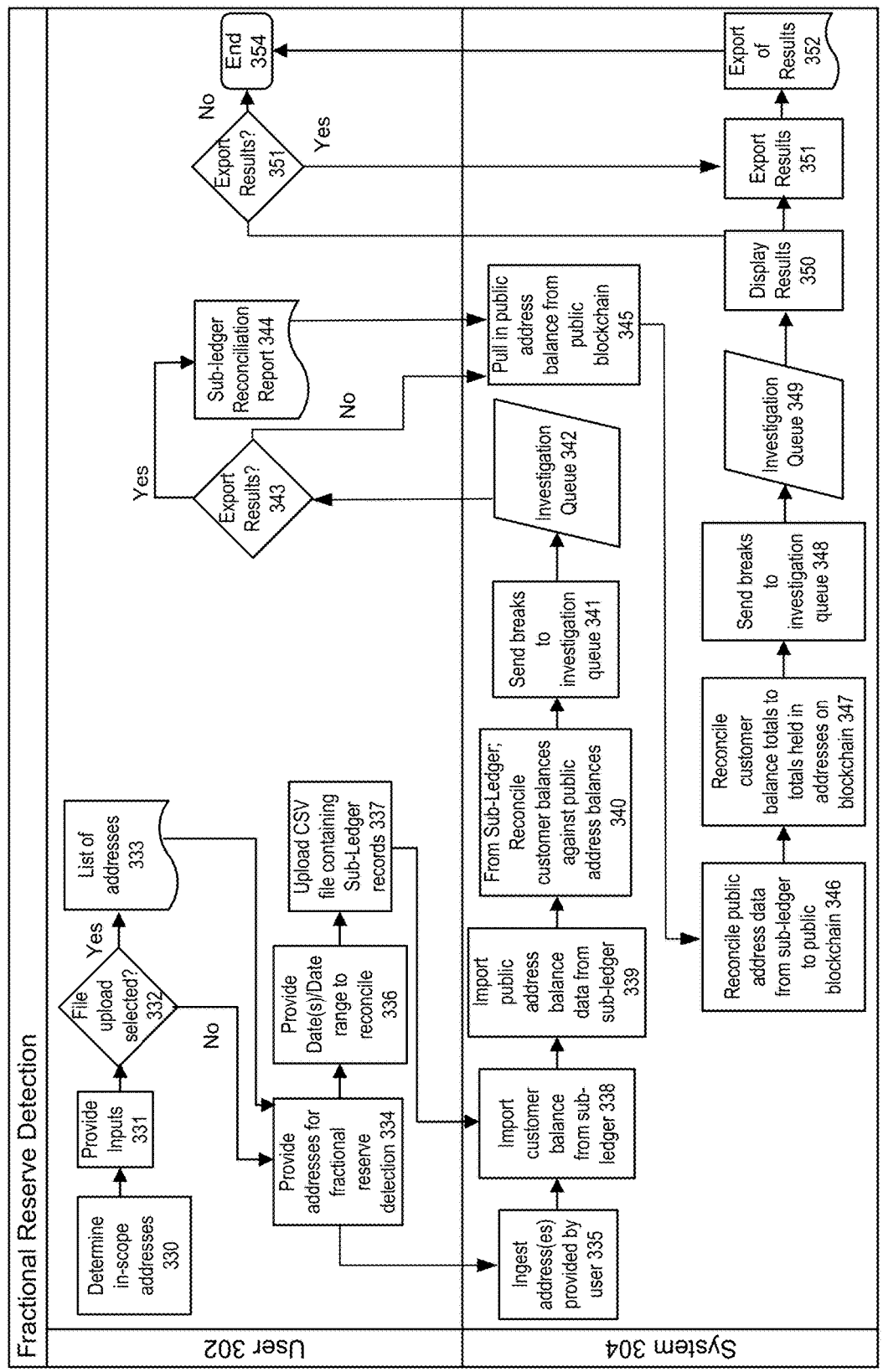
FIG. 3B depicts a user interaction for fractional reserve detection with the system in FIG. 1c according to an exemplary embodiment of the invention.

FIG. 3B depicts a user interaction for fractional reserve detection with the system in FIG. 1c according to an exemplary embodiment of the invention. FIG. 3B illustrates interactions between User 302 and System 304. As depicted in FIG. 3B, the in-scope addresses can be determined at 330. In order to do this, the user may need to provide a number of different inputs to the platform at 331. For example, the user can provide: (i) a short description to outline the purpose/additional information of the run, (ii) a selection if one address, multiple addresses, or a file of addresses will be provided, (iii) address(es) and/or file corresponding to the address(es) and/or file selection, (iv) a selection if the validation will correspond to one date, multiple dates, or a date range, and/or (v) dates corresponding to the date selection. Further, according to an embodiment, a fractional reserve detection can be run automatically based on a user-defined frequency (e.g., once per hour, once per day, etc.). Further, the user who scheduled the automatic fractional reserve runs can be notified in case of an unsuccessful run. In addition, the user can also initiate a fraction reserve detection run manually, even if an automatic schedule is defined.

After the inputs are provided, it is then determined if the file upload option for addresses was selected at 332. In this regard, if the file upload option was selected, the list of accounts/addresses can be provided as a CSV file, Excel file, or another file type in a pre-determined format at 333. Further, the platform can also detect the type of address for each address that was provided in the uploaded file. If the type for an address cannot be automatically detected, the platform can then indicate to user which address the type could not be detected. In this regard, processing for any of the addresses cannot begin until all of the issues associated with the address types have been resolved. Further, if an address is provided for a blockchain for which the platform cannot pull data, the user can be informed and required to submit a new upload without that particular address.

If the upload option was not selected, the user can then provide one or more addresses for fractional reserve detection at 334. According to an embodiment, the user can provide a single wallet address or multiple addresses to the platform via the UI. In this regard, additional addresses can be added as needed, without an upper limit. Further, if the platform cannot detect an address type automatically, the user can be provided with an option to define an address type (e.g., Bitcoin address, Ethereum address, etc.) In addition, the address can be validated based on address type. If an address is invalid, the platform can reject the address and the UI can provide feedback indicating such. Further, if the address type is invalid, the address balance validation flow will cease to execute. In this regard, the flow will execute if the address is valid and the address type is a blockchain from which the platform pulls data. As such, the user can be informed of errors and be given an opportunity to correct them.

After which, the platform can ingest and/or import the one or more addresses provided by the user at 335. Further, as depicted in the figure, the user can provide one or more dates and/or a date range to reconcile at 336. For example, the one or more dates and date ranges can be provided via a pop-up calendar. A user may then be required to upload a file containing the sub-ledger records, e.g., CSV, Excel, or other file format at 337. Then, as depicted in the figure, another sub-ledger file, which contains the customer account balance, can also be uploaded at 338. In this regard, if the provided sub-ledger file does not follow the required structure, the platform can provide feedback to the user indicating such and also request that a new file be uploaded. Further, if necessary, balances can be calculated.

After which, public address balance data can be imported from the sub-ledger at 339. In this regard, the platform can determine balances for the addresses in the sub-ledger for the given dates. The platform can then reconcile the sub-ledger against the customer accounts. Further, the platform can also reconcile the blockchain against the customer accounts at 340. Then, as depicted in the figure, the platform sends breaks to a separate investigation queue for the user to view at 341 and 342. In this regard, the breaks could be available in a separate screen to the user, in which the user is only able to view the breaks. It is then determined if the result should be exported at 343. If so, the results can be converted to a CSV or other file format, and then exported to a sub-ledger reconciliation report at 344. Otherwise, the platform can pull in public address balance data from the public blockchain at 345. In this regard, the platform can access at least one blockchain (e.g., Bitcoin, Bitcoin Cash, Ethereum, Litecoin, etc.) via the blockchain API service. The platform can then determine the balances of the address (es) from the public blockchain for the given date(s). Then, the platform can reconcile balances from the sub-ledger to the public blockchain at 346. After which, the platform can reconcile customer balance total to totals held in addresses on a blockchain at 347. In particular, the platform reconciles the customer balance totals by crypto-asset type. At 348, the breaks are then sent to a separate investigation queue via 349 for the user to view. The results of the fractional reserve detection can then be displayed to the user via the UI at 350. According to an embodiment, the UI is configured to display the balances of addresses in the system, as well as the breaks, and the option to export to a CSV at 351. In this regard, if the user selects to export the results, the results may convert to a CSV file (or other predefined format) at 352, 353. The process ends at 354.

In this regard, the results can include (i) a complete list of items that were reconciled both within the sub-ledger as well as with the public blockchain with dollar amounts, (ii) a complete list of all items that could not be reconciled due to mismatch in amounts in account/addresses with dollar amounts (breaks), and/or (iii) a complete list of all items that could not be reconciled because the address could not be found in one source with dollar amounts (breaks).

According to an embodiment, the complete list of reconciled items can include at least one or more of the following information: an address/customer account number, a type of address, a begin balance (first date selected by user) for customer account as well as address as per relevant source, an end balance (last date selected by user) for customer account as well as address as per relevant source, a first transaction ever conducted by this address as per sub-ledger as well as public blockchain, a most recent transaction within the time period defined by the user as per sub-ledger as well as public blockchain, and/or a number of transactions completed by the address in the given time period as per sub-ledger as well as public blockchain.

Further, the complete list of items that could not be reconciled due to mismatch can include at least one or more of the following information: an address/customer account number, a type of address, a begin balance (first date selected by user) for customer accounts as well as address(es) as per relevant source, an end balance (last date selected by user) for customer accounts as well as address(es) as per relevant source, a difference of begin balances (customer account total—sub-ledger address total & sub-ledger address—public blockchain & customer account total—blockchain address total), a difference of end balances (customer account total—sub-ledger address total & sub-ledger address—public blockchain & customer account total—blockchain address total), a first transaction ever conducted by this address as per sub-ledger and public blockchain, a most recent transaction within the time period defined by the user as per sub-ledger and public blockchain, and/or a number of transactions completed by the address in the given time period as per sub-ledger and public blockchain.

Lastly, the complete list of all items that could not be reconciled because the address could not be found in one source with dollar amounts can include at least one or more of the following information: address, type of address, where the address was found (sub-ledger or public blockchain), a begin balance (first date selected by user) for address as per relevant source, an end balance (last date selected by user) for address as per relevant source, a first transaction ever conducted by this address as per source, a most recent transaction within the time period defined by the user as per source, and/or a number of transactions completed by the address in the given time period as per source. Further, the results can also include the name of the person who ran the report.

Further, according to an embodiment, the platform can provide the user the ability to see an audit log of transactions at a granular level for all of the above use cases, changes to user access, and/or changes to the platform.

Figure 3C:
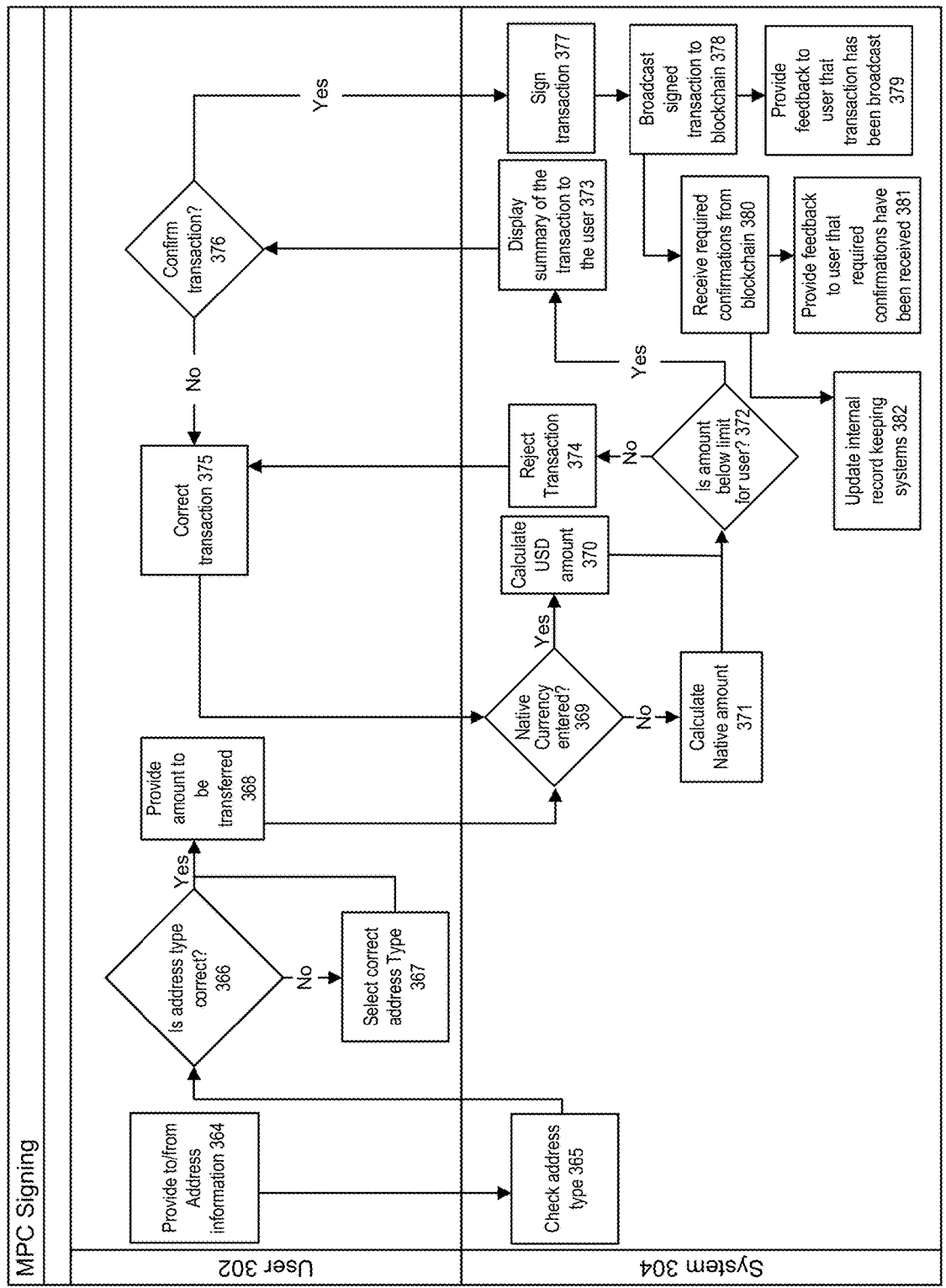
FIG. 3C depicts a user interaction for multiparty computation signing with the system in FIG. 1c according to an exemplary embodiment of the invention.

FIG. 3C depicts a user interaction for MPC signing with the system in FIG. 1c according to an exemplary embodiment of the invention. According to an embodiment, during an MPC signing: a user can request a funds transfer through a UI; the transaction can be signed using MPC; and, once the transaction is signed, the signed transaction is propagated to and recorded on the blockchain, which is when the funds can be officially transferred. For example, as depicted in the figure, a user can first provide the information required for sending funds, such as an address from which funds should be sent, an address to which funds should be sent, a currency type, and/or an amount at 364. System may check address type at 365. According to an embodiment, the user can select an address from which funds should be sent as well as an address to which funds should be sent from respective lists of pre-defined addresses at 367. Then, after the exemplary system confirms with the user that the address type is correct at 366, the user can enter the amount to be transferred at 368. According to embodiment, the amount entered can either be in a native currency or another currency, e.g., U.S. dollars. In this regard, if the amount entered is a native currency, the system can calculate the U.S. dollar amount corresponding to the native amount and then display it in the field where a U.S. dollar amount can be entered at 370. If the amount is entered in another currency, e.g., U.S. dollars, the system can calculate the native amount corresponding to the U.S. dollar amount at 371. The user can then submit the transaction for processing. After which, the system determines if the amount requested to be transferred is below a pre-defined limit for the given user at 372. If the amount is under the defined limit, the system can provide a summary screen of the information entered to the user for confirmation at 373. If the amount is over the defined limit, the system can reject the transaction at 374 and provide user the option to correct the amount at 375. According to an embodiment, assuming the amount is under the defined limit, the user can confirm the transaction for processing at 376. If the user confirms, the exemplary system can sign the transaction using MPC at 377. The system can then broadcast the signed transaction to the blockchain network at 378. In this regard, the system can also provide feedback to the user that transaction has been broadcast at 379. Further, according to an embodiment, the system can also wait for a pre-determined number of confirmations from the blockchain and, after receiving the required confirmations at 380, provide feedback to the user that the required confirmations had been received at 381. In this regard, after the user is provided feedback, the user can view certain information on the executed transactions at 382, such as: transaction status (mempool/broadcast, number of confirmations), block containing transaction, time elapsed between MPC signing and broadcast, transaction fee (e.g., gwei/gas, Satoshis per byte), blockchain submitted, transaction hash, address to which funds should be sent, address from which funds should be sent, native amount, other currency amount (e.g., U.S. dollar), memo (if appropriate), internal transactions, and/or gas used. Further, the system can also update any externals connected to the system in order to reflect the movement of assets.

Figure 3D:
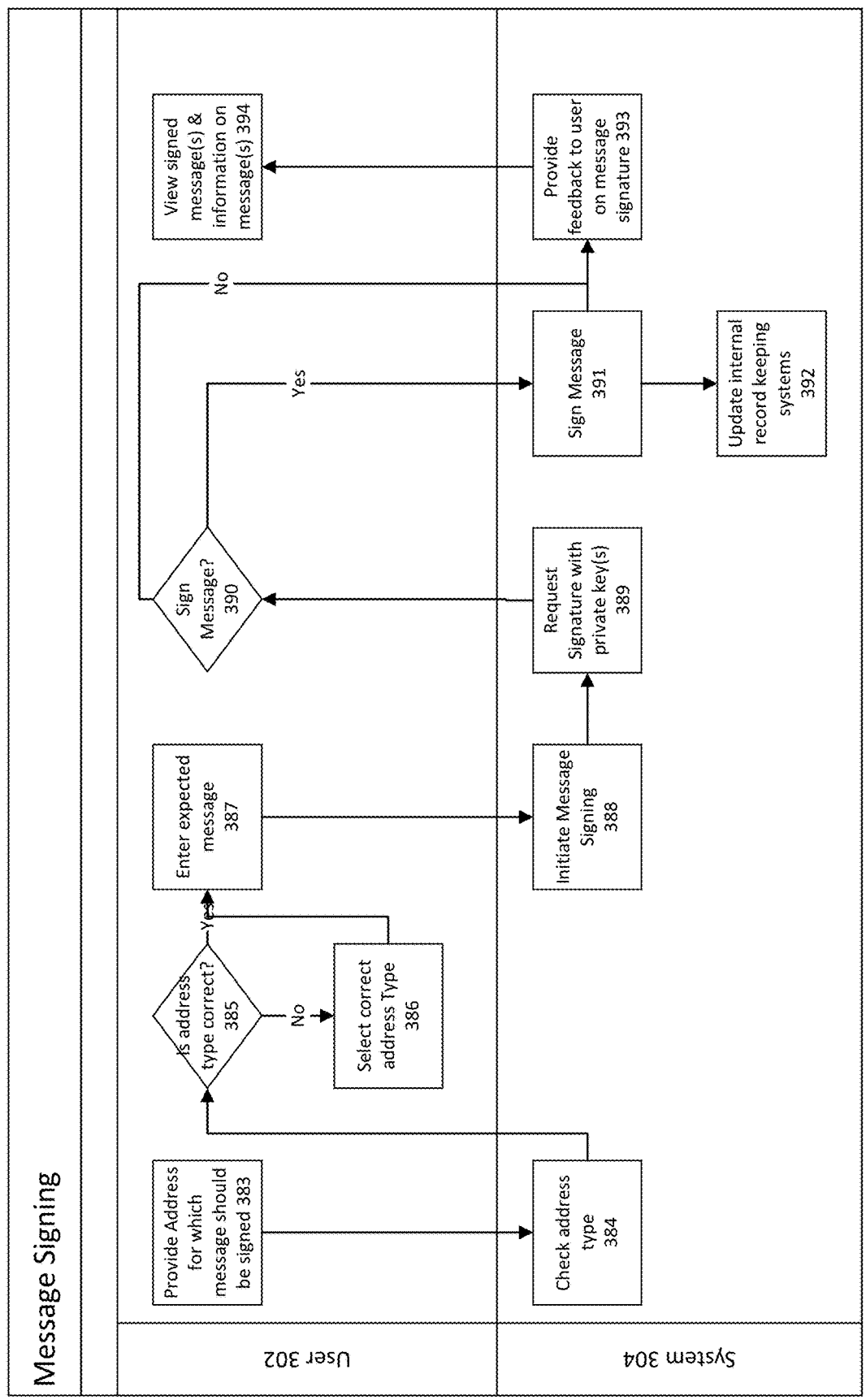
FIG. 3D depicts a user interaction for message signing with the system in FIG. 1c according to an exemplary embodiment of the invention.

FIG. 3D depicts a user interaction for message signing with the system in FIG. 1c according to an exemplary embodiment of the invention. FIG. 3D illustrates interactions between User 302 and System 304. As shown in FIG. 3D, User 302 may provide an address for which a message should be signed at 383. System 304 may then check a corresponding address type at 384. User 302 may verify that the address type is correct at 385. If not correct, User 302 may select a correct address type at 386. If correct, an expected message may be entered at 387. System 304 may then initiate message signing at 388. At 389, a signature with private key(s) may be requested. User 302 may sign the message at 390, which is then recognized or acknowledged by System 304, at 391. Internal record keeping systems may be updated at 392. If the message is not signed, feedback may be provided to the user on the message signature at 393. The user may then view the signed message(s) and information on the message(s) at 394.

Figure 3E:
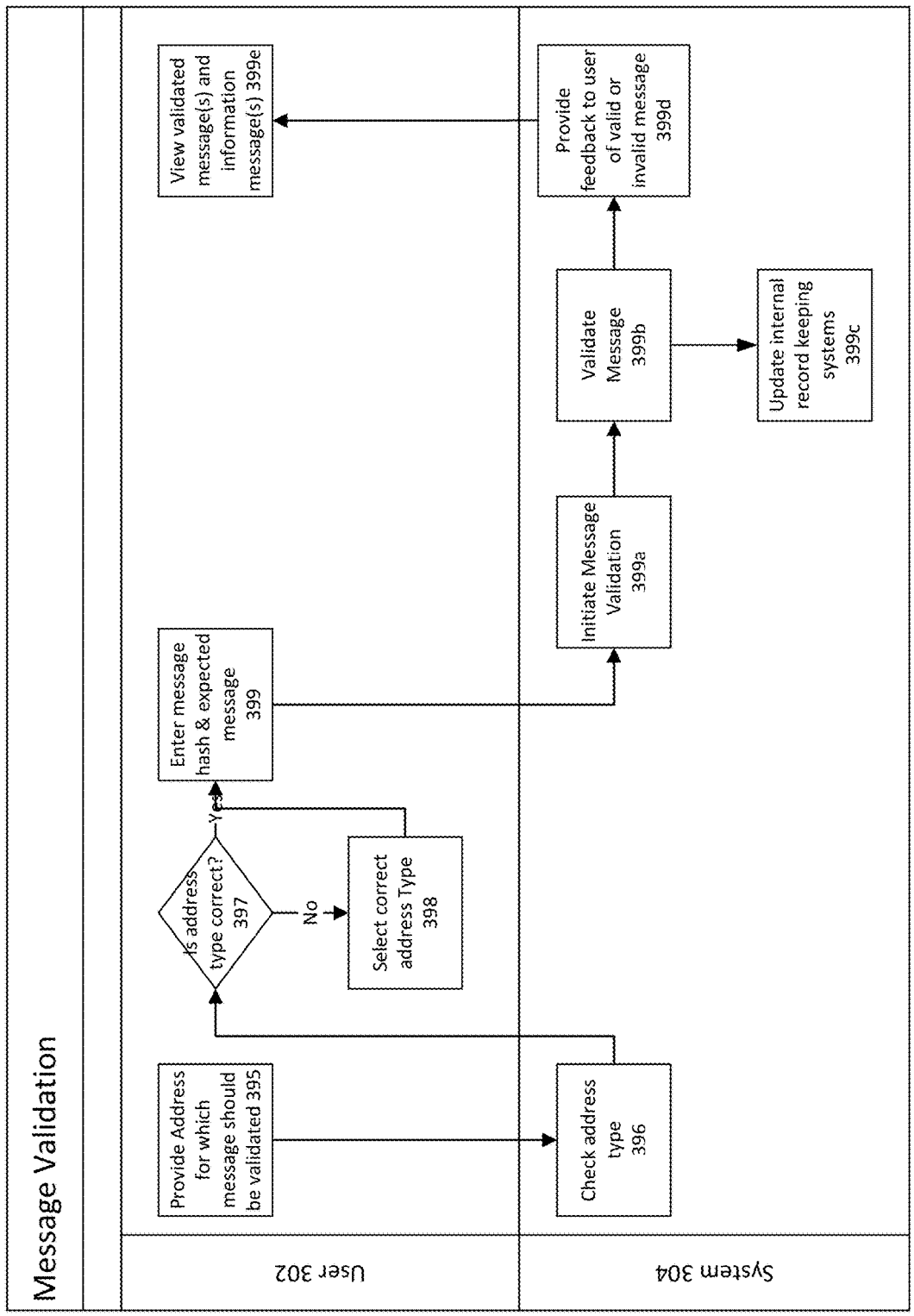
FIG. 3E depicts a user interaction for message validation with the system in FIG. 1c according to an exemplary embodiment of the invention.

FIG. 3E depicts a user interaction for message validation with the system in FIG. 1c according to an exemplary embodiment of the invention. FIG. 3E illustrates interactions between User 302 and System 304. As shown in FIG. 3E, User 302 may provide an address for which a message should be validated at 395. System 304 may then check a corresponding address type at 396. User 302 may verify that the address type is correct. If not correct, User 302 may select a correct address type at 398. If correct, User 302 may enter a message hash and an expected message at 399. System 304 may then initiate message validation at 399a and validate the message at 399b. Internal record keeping systems may be updated at 399c. Feedback may be provided to the user of a valid or invalid message at 399d. The user may then view the validated message(s) and information on the message(s) at 399e.

FIG. 4A depicts a user interface that can be utilized for reconciliation during the user interaction in FIG. 3A according to an exemplary embodiment of the invention. As shown in FIG. 4A, use case description may be provided at 403 and a run description at 404. The use case description may be user provided, automatically populated or generated and/or a combination thereof. As depicted in the figure, the UI 402 provides an ability for the user to: select the type of validation at 405, e.g., "Reconciliation" or "Calculate Address Balances;" upload a sub-ledger file at 406; select whether a single or multiple blockchain addresses will be processed at 407; input the blockchain address name and type at 408; select whether a single, multiple, or a range of dates for the run at 409; and input the specific date(s) for the run at 410. In this regard, "Reconciliation" is selected for the type of validation, a .CSV file is uploaded for the sub-ledger, a single blockchain address (e.g., Bitcoin blockchain) is used, and a range of dates are provided for reconciliation. As described above, the reconciliation provides multiple outputs: (i) a complete list of items that could be reconciled with dollar amounts (e.g., FIG. 4B) and (ii) a complete list of items that could not be reconciled with dollar amounts (breaks) (e.g., FIG. 4C).

FIG. 4B depicts a user interface of an address balance validation, according to an exemplary embodiment of the invention. FIG. 4B provides an exemplary illustration of items that could be reconciled, as noted by 411. FIG. 4B provides details relating to Address 413, Currency 414, Date 415, Balance (native) SL 416, Balance (USD) SL 417, Balance (native) blockchain 418, Balance (USD) blockchain 419, First Transaction 420, Last Transaction 421 and number of Transactions 422. FIG. 4B is exemplary only and other variations may be realized in accordance with the embodiments of the present invention.

FIG. 4C depicts a user interface of an address balance validation, according to an exemplary embodiment of the invention. FIG. 4C provides an exemplary illustration of items that could not be reconciled, as noted by 412. FIG. 4C provides details relating to Address 413, Currency 414, Date 415, Balance (native) SL 416, Balance (USD) SL 417, Balance (native) blockchain 418, Balance (USD) blockchain 419, First Transaction 420, Last Transaction 421 and number of Transactions 422. FIG. 4C further illustrates Difference (native) 430 and Difference (USD) 431. FIG. 4C is exemplary only and other variations may be realized in accordance with the embodiments of the present invention.

FIG. 4D depicts a user interface that can be utilized for calculating address balances during the user interaction in FIG. 3A according to an exemplary embodiment of the invention. As depicted in the figure, FIG. 4D is similar to FIG. 4A except that "Calculate Address Balances" is selected for the type of validation instead of "Reconciliation," at 430. As such, a sub-ledger file does not need to be uploaded. In this regard, a single blockchain address is used (e.g., Bitcoin blockchain) at 431, 432 and a range of dates are provided for the address balance calculation. Further, exemplary calculated address balances are provided in FIG. 4E.

FIG. 4E depicts a user interface of an address balance validation, according to an exemplary embodiment of the invention. FIG. 4E provides an exemplary illustration of calculated address balances. FIG. 4E provides details relating to Address 440, Currency 441, Date 442, Balance (native) 443, Balance (USD) 444, First Transaction 445, Last Transaction 446 and number of Transactions 447. FIG. 4E is exemplary only and other variations may be realized in accordance with the embodiments of the present invention.

Figure 4F:
FIG. 4F depicts a user interface that can be utilized for fractional reserve detection during the user interaction in FIG. 3B according to an exemplary embodiment of the invention.

FIG. 4F depicts a user interface that can be utilized for fractional reserve detection during the user interaction in FIG. 3B according to an exemplary embodiment of the invention. As shown in FIG. 4F, use case description may be provided at 450 and a run description at 451. The use case description may be user provided, automatically populated or generated and/or a combination thereof. As depicted in the figure, the UI provides an ability for the user to: upload a sub-ledger file at 452; upload a customer account balance file at 453; select whether a single or multiple blockchain addresses will be processed at 454; input the blockchain address name and type at 455; select whether a single, multiple, or a range of dates for the run at 456; and input the specific date(s) for the run at 457. In this regard, a .CSV file is uploaded for the sub-ledger, another .CSV file is uploaded for the customer account(s), multiple blockchain addresses (e.g., Bitcoin blockchain, Ethereum blockchain, etc.) are used, and a single date is provided for the fractional reserve detection.

In this regard, as described above, the fractional reserve detection can result in a number of outputs: (i) a complete list of addresses that were reconciled (e.g., FIG. 4G), (ii) a complete list of addresses that could not be reconciled due to mismatch in SL and blockchain amounts (e.g., FIG. 4H), (iii) a complete list of addresses that could not be reconciled because data for the address could not be found in one source (SL or blockchain)(e.g., FIG. 4I), (iv) a complete list of customer accounts that were reconciled (e.g., FIG. 4J), and/or (v) a complete list of customer accounts that could not be reconciled (e.g., FIG. 4K). The construction of merkle tree proofs may be generated using privacy protecting techniques to obfuscate unrelated information while providing cryptographic guarantees that customer accounts are included.

FIG. 4G depicts a user interface of a fractional reserve detection, according to an exemplary embodiment of the invention. FIG. 4G provides an exemplary illustration of addresses that were reconciled as noted by 460. FIG. 4G provides details relating to Address Type 470, Currency 471, Date 472, Balance (native) SL 473, Balance (USD) SL 474, Balance (native) blockchain 475, Balance (USD) blockchain 476, First Transaction 477, Last Transaction 478 and number of Transactions 479. FIG. 4G is exemplary only and other variations may be realized in accordance with the embodiments of the present invention.

FIG. 4H depicts a user interface of a fractional reserve detection, according to an exemplary embodiment of the invention. FIG. 4H provides an exemplary illustration of addresses that could not be reconciled due to mismatch in amounts between the SL and the blockchain as noted by 461. FIG. 4H provides details relating to Address Type 470, Currency 471, Date 472, Balance (native) SL Address 473, Balance (USD) SL Address 474, Balance (native) blockchain Address 475, Balance (USD) blockchain Address 476, First Transaction 477, Last Transaction 478 and number of Transactions 479. FIG. 4H also includes Difference (native) 480 and Difference (USD) 481. FIG. 4H is exemplary only and other variations may be realized in accordance with the embodiments of the present invention.

FIG. 4I depicts a user interface of a fractional reserve detection, according to an exemplary embodiment of the invention. FIG. 4I provides an exemplary illustration of addresses that could not be reconciled because a balance could not be found for the address in one source as noted by 462. FIG. 4I provides details relating to Address Type 470, Currency 471, Date 472, Balance (native) SL Address 473, Balance (USD) SL Address 474, Balance (native) blockchain Address 475, Balance (USD) blockchain Address 476, First Transaction 477, Last Transaction 478 and number of Transactions 479. FIG. 4I is exemplary only and other variations may be realized in accordance with the embodiments of the present invention.

FIG. 4J depicts a user interface of a fractional reserve detection, according to an exemplary embodiment of the invention. FIG. 4J provides an exemplary illustration of customer reconciliation data as noted by 463. More specifically, FIG. 4J shows days for which the total assets held for customers in customer accounts reconciled with totals held per sub-ledger and blockchain. FIG. 4J provides details relating to Address Type 482, Total held for Customers (native) 483, Total held for Customers (UDS) 484, Balance in Subledger address (native) 485, Balance in Subledger address (USD) 486, Balance on Chain (native) 487 and Balance on Chain (USD) 488. FIG. 4J is exemplary only and other variations may be realized in accordance with the embodiments of the present invention.

FIG. 4K depicts a user interface of a fractional reserve detection, according to an exemplary embodiment of the invention. FIG. 4K provides an exemplary illustration of customer account amounts that could not be reconciled between the SL and blockchain as noted by 464. FIG. 4K provides details relating to Address Type 482, Total held for Customers (native) 483, Total held for Customers (UDS) 484, Balance in Subledger address (native) 485, Balance in Subledger address (USD) 486, Balance on Chain (native) 487 and Balance on Chain (USD) 488. FIG. 4K also provides Difference to Subledger (native) 489, Difference to Subledger (USD) 490, Difference to on chain assets (native 491 and Difference to on chain assets (USD) 492. FIG. 4K is exemplary only and other variations may be realized in accordance with the embodiments of the present invention.

It will be appreciated by those persons skilled in the art that the various embodiments described herein are capable of broad utility and application. Accordingly, while the various embodiments are described herein in detail in relation to the exemplary embodiments, it is to be understood that this disclosure is illustrative and exemplary of the various embodiments and is made to provide an enabling disclosure. Accordingly, the disclosure is not intended to be construed to limit the embodiments or otherwise to exclude any other such embodiments, adaptations, variations, modifications and equivalent arrangements. For example, although the various embodiments described herein refer to blockchains and blockchain-related technology, the invention is not limited to such embodiments but, rather, can be used with any distributed ledger technology.

The system described above can be implemented with servers and other computing devices in various configurations. The various servers and computing devices may use software to execute programs to execute the methods described above. Various embodiments of the invention also relate to the software or computer readable medium containing program instructions for executing the above described methods.

Although the foregoing examples show the various embodiments of the invention in one physical configuration; it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Communications networks connect the various computing devices described above and may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The communications networks that connect the various computing devices described above may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a GPS link, a cellular digital packet data (CDPD) link, a Research in Motion, Limited (RIM) duplex paging type device, a Bluetooth radio link, or an IEEE 802.11-based radio frequency link as well as mobile networks including 5G. Communications networks may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, the communication networks may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, communication networks may comprise a Personal Branch Exchange (PBX), which may further connect to the PSTN.

Although examples of servers and personal computing devices are described above, exemplary embodiments of the invention may utilize other types of communication devices whereby a user may interact with a network that transmits and delivers data and information used by the various systems and methods described herein. The personal computing devices may include desktop computers, laptop computers, tablet computers, smart phones, and other mobile computing devices, for example. The servers and personal computing devices may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The personal computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device. The personal computing devices may include various connections such as a cell phone connection, WiFi connection, Bluetooth connection, satellite network connection, and/or near field communication (NFC) connection, for example.

The servers and personal computing devices described above may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers and personal computing devices described above may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript and others. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

The software, hardware and services described herein may be provided utilizing one or more cloud service models, such as Software-as-a-Service (SaaS), Platform-as-a-Service (PaaS), and Infrastructure-as-a-Service (IaaS), on premise deployments and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system implementing a custody services platform for cryptoassets, the system comprising:
   a gateway configured to receive input data from a user interface;
   an intelligent transaction policy engine that applies a set of policy rules to intelligently process one or more transactions on a blockchain network; and
   a custody adapter that comprises a computer processor, coupled to the intelligent transaction policy engine, that is configured to interface with a plurality of sub-custody providers and an internal custody system based on custody relationship type, wherein the computer processor is further configured to perform the steps of:

receiving, via an interface, an API call from a first sub-custody provider relating to a transaction;

normalizing the API call to perform a set of functions associated with the first sub-custody provider for the transaction;

structuring the transaction to interact with the plurality of sub-custody providers and the internal custody platform that provide custodian services for digital assets, wherein the internal custody platform supports Third Party Custody services, Software-as-a-Service (SaaS) services, Platform-as-a-Service (PaaS) services, and On-Premise services;

enabling the transaction to be processed by the intelligent transaction policy engine, wherein the intelligent transaction policy engine interfaces with an Off-Chain interface and an On-Chain interface.

2. The system of claim 1, wherein the input data comprises one or more of: a transaction type, a custody source, one or more transaction details and on/off chain data.

3. The system of claim 1, wherein the intelligent transaction policy engine applies a set of policies to the transaction wherein the set of polices relate to one or more of: asset type, risk profile, custody type, custody risk profile, on-chain AML (anti-money laundering) risk, on-chain network risk, and off-chain network risks.

4. The system of claim 1, wherein the intelligent transaction policy engine comprises a policy rules engine and policy configuration portal.

5. The system of claim 1, wherein the intelligent transaction policy engine comprises an on-chain inputs module and off-chain custody policies module.

6. The system of claim 1, wherein the internal custody platform supports proprietary hardware security modules.

7. The system of claim 1, wherein the transaction is processed as an approved transaction that is broadcast by a custody provider.

8. The system of claim 1, wherein the transaction is processed as an approved transaction via a deployed node infrastructure.

9. The system of claim 1, wherein the intelligent transaction policy engine applies a rule set based on the transaction type and one or more business objectives.

10. The system of claim 1, wherein the On-Chain interface analyzes data from blockchain networks in real-time.

11. A method for implementing a custody services platform for cryptoassets, the method comprising the steps of:

receiving, at a gateway, input data from a user interface;

applying, via an intelligent transaction policy engine, a set of policy rules to intelligently process one or more transactions on a blockchain network; and interfacing, via a custody adapter, with a plurality of sub-custody providers and an internal custody system based on custody relationship type;

receiving, via an interface, an API call from a first sub-custody provider relating to a transaction;

normalizing, via the custody adapter, the API call to perform a set of functions associated with the first sub-custody provider for the transaction;

structuring, via the custody adapter, the transaction to interact with the plurality of sub-custody providers and the internal custody platform that provide custodian services for digital assets, wherein the internal custody platform supports Third Party Custody services, Software-as-a-Service (SaaS) services, Platform-as-a-Service (PaaS) services, and On-Premise services; and enabling, via the custody adapter, the transaction to be processed by the intelligent transaction policy engine, wherein the intelligent transaction policy engine interfaces with an Off-Chain interface and an On-Chain interface.

12. The method of claim 11, wherein the input data comprises one or more of: a transaction type, a custody source, one or more transaction details and on/off chain data.

13. The method of claim 11, wherein the intelligent transaction policy engine applies a set of policies to the transaction wherein the set of polices relate to one or more of: asset type, risk profile, custody type, custody risk profile, on-chain AML (anti-money laundering) risk, on-chain network risk, and off-chain network risks.

14. The method of claim 11, wherein the intelligent transaction policy engine comprises a policy rules engine and policy configuration portal.

15. The method of claim 11, wherein the intelligent transaction policy engine comprises an on-chain inputs module and off-chain custody policies module.

16. The method of claim 11, wherein the internal custody platform supports proprietary hardware security modules.

17. The method of claim 11, wherein the transaction is processed as an approved transaction that is broadcast by a custody provider.

18. The method of claim 11, wherein the transaction is processed as an approved transaction via a deployed node infrastructure.

19. The method of claim 11, wherein the intelligent transaction policy engine applies a rule set based on the transaction type and one or more business objectives.

20. The method of claim 11, wherein the On-Chain interface analyzes data from blockchain networks in real-time.

* * * * *